US011685533B2

(12) United States Patent
Clark et al.

(10) Patent No.: US 11,685,533 B2
(45) Date of Patent: Jun. 27, 2023

(54) SELECTIVELY DEPLOYABLE HEATED PROPULSOR SYSTEM

(71) Applicant: BETA AIR, LLC, South Burlington, VT (US)

(72) Inventors: Kyle B. Clark, Underhill, VT (US); Riley Griffin, Montpelier, VT (US); Augustus Brightman, Williston, VT (US); Steven Arms, Shelburne, VT (US); Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 8 days.

(21) Appl. No.: 17/404,886

(22) Filed: Aug. 17, 2021

(65) Prior Publication Data

US 2021/0380261 A1 Dec. 9, 2021

Related U.S. Application Data

(63) Continuation of application No. 16/427,298, filed on May 30, 2019, now Pat. No. 11,124,304.

(60) Provisional application No. 62/678,612, filed on May 31, 2018.

(51) Int. Cl.
*B64D 15/02* (2006.01)
*B64C 29/00* (2006.01)
*H02K 1/22* (2006.01)

(52) U.S. Cl.
CPC .......... *B64D 15/02* (2013.01); *B64C 29/0016* (2013.01); *H02K 1/22* (2013.01)

(58) Field of Classification Search
CPC ..... B64D 15/02; B64C 29/0016; B64C 11/28; B64C 27/30; H02K 1/22
See application file for complete search history.

(56) References Cited

U.S. PATENT DOCUMENTS

| | | | | |
|---|---|---|---|---|
| 3,088,694 A | * | 5/1963 | Stirgwolt | B64C 29/0016 244/12.3 |
| 6,622,962 B1 | * | 9/2003 | White | B64C 27/26 244/12.3 |
| 9,975,631 B1 | * | 5/2018 | McLaren | B64C 11/46 |
| 2006/0151666 A1 | * | 7/2006 | VanderMey | B64C 29/0016 244/12.3 |
| 2015/0260047 A1 | * | 9/2015 | Gieras | H05B 1/0236 416/95 |
| 2018/0327091 A1 | * | 11/2018 | Burks | B64F 1/007 |
| 2018/0362154 A1 | * | 12/2018 | Louis | B64C 27/30 |
| 2019/0100322 A1 | * | 4/2019 | Schank | B64C 27/28 |

* cited by examiner

*Primary Examiner* — Rodney A Bonnette
(74) *Attorney, Agent, or Firm* — Caldwell Intellectual Property Law

(57) ABSTRACT

A selectively deployable heated propulsor system which may be integrated into vehicles, airplanes, or any other machinery configured for flight. The system includes a structural feature that includes a mounted propulsor including a rotor and a motor mechanically coupled to the rotor allowing the rotor to rotate when in an activated mode. The mounted propulsor includes a chamber configured to support a first configuration where the propulsor and the rotor are stowed and heated in an enclosed environment, and a second configuration where the rotor is deployed.

20 Claims, 13 Drawing Sheets

SELECTIVELY DEPLOYABLE HEATED PROPULSOR SYSTEM

CROSS-REFERENCE TO RELATED APPLICATION

This application is a continuation of U.S. Nonprovisional application Ser. No. 16/427,298 filed on May 30, 2019, and entitled, "A SELECTIVELY DEPLOYABLE HEATED PROPULSOR SYSTEM", which claims the benefit of priority of U.S. Provisional Application No. 62/678,612 entitled "A SELECTIVELY DEPLOYABLE HEATED PROPULSOR SYSTEM", filed May 31, 2018, which is hereby incorporated herein by reference in its entirety and made part of the present U.S. Utility patent application for all purposes.

FIELD OF THE INVENTION

The present invention generally relates to the field of propulsion systems for aircraft. In particular, the present invention is directed to a selectively deployable heated propulsor system.

BACKGROUND

Historically, critical components of airplanes and other machinery configured for flight have been susceptible to the build-up of ice caused by low temperatures associated with either cold temperatures during the winter months or low temperatures inherent to higher altitudes. Due to the specific shape and structure of flight components necessary to provide proper lift for flight, it is imperative that these components do not suffer from build-up of ice otherwise a component may be affected during flight resulting in improper or limited functionality.

Furthermore, the stability, flight control, or thrust needs of aircraft may vary over the course of a flight, either because of differing needs of flight phases, such as takeoff and landing versus cruising, or because of contingencies that may occur during flight, such as unexpected levels of turbulence. This varying need for thrust may be met by modifying the power provided to propulsors, or by use of additional propulsors at moments when the need is greater. The latter solution can be particularly attractive where an aircraft has an intermittent or occasional need for downward thrust, such as may be the case for an aircraft that takes off and/or lands vertically or may need to hover at certain points in its flight. However, propulsors that are only occasionally used can create liabilities of their own. Inactive propulsors can be a source of drag, increasing energy consumption. Ice can also build up on such propulsors while inactive and interfere with their ability to activate at the right moment or may alter the avionic characteristics of the propulsors when active, for instance by building up on rotor blade.

SUMMARY OF THE DISCLOSURE

In one aspect, a system for selectively deploying heated propulsors includes at least a propulsor mounted on at least a structural feature. The at least a propulsor includes at least a rotor, at least a mechanically coupled motor configured to cause the rotor to rotate when activated. The system further includes at least a chamber configured to stow the at least a propulsor. The at least a chamber and the at least a propulsor are configured to move relative to one another between a first configuration in which the at least a rotor is stowed within the at least a chamber and a second configuration in which the at least a rotor is deployed outside of the at least a chamber. The system further includes a heating element thermally connected to the at least a chamber configured to heat the at least a chamber and at least a rotor when the at least a chamber and the at least a propulsor are in the first configuration.

In another aspect, a vehicle with a stowable propulsion system includes an electronic aircraft configured for vertical takeoff and landing. The vehicle includes at least a propulsor mounted on at least a structural feature. The at least a propulsor includes at least a rotor, at least a mechanically coupled motor configured to cause the rotor to rotate when activated. The vehicle further includes at least a chamber configured to comprise the at least a propulsor. The at least a chamber and the at least a propulsor are configured to move relative to one another between a first configuration in which the at least a rotor is stowed within the at least a chamber and a second configuration in which the at least a rotor is deployed outside of the at least a chamber. The vehicle further includes a heating element thermally connected to the at least a chamber configured to heat the at least a chamber and at least a rotor when the at least a chamber and the at least a propulsor are in the first configuration.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1A:
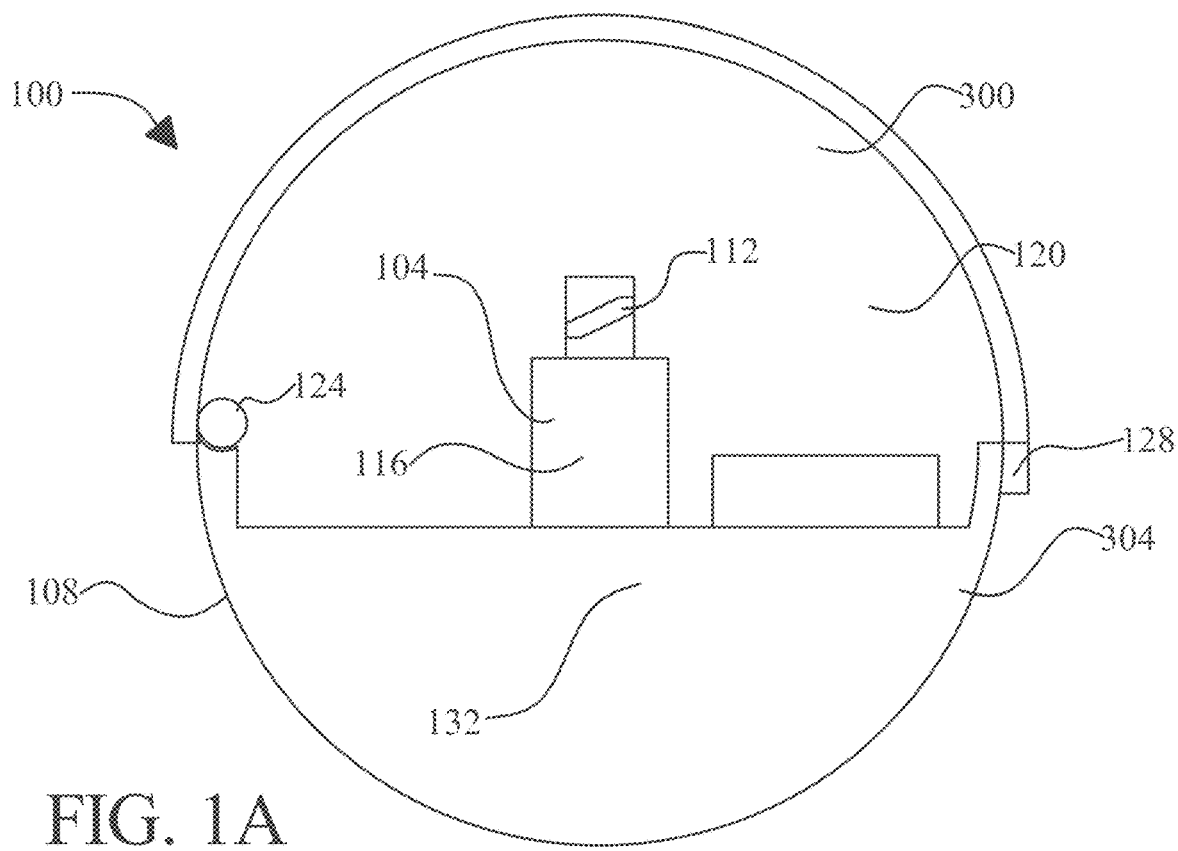
FIGS. 1A-B are schematic diagrams depicting an exemplary embodiment of the disclosed system.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to embodiments of systems for selectively deploying heated propulsors. Systems for selectively deploying heated propulsors may be integrated into vehicles, airplanes, or any other machinery configured for flight. The systems disclosed herein utilize stowable rotors to provide additional thrust in situations requiring additional thrust, such as take-off, landing, hovering, or high-turbulence situations, while avoiding drag from the stowable rotors where not needed. In one embodiment, a structural feature includes a mounted propulsor including a rotor and a motor mechanically coupled to the rotor allowing the rotor to rotate when in an activated mode. The mounted propulsor includes a chamber configured to support a first configuration where the propulsor and the rotor are stowed and heated in an enclosed environment, and a second configuration where the rotor is deployed. Here and as will be appreciated after reading this disclosure in its entirety by a person of ordinary skill in the art, is a system configured to integrate with a vehicle that supports lift and thrust supplied by rotors or any other type of machinery configured for flight. The rotors may be applied at any point in time during any of the flight phases.

In some embodiments, the systems include a heating element configured to heat the interior space of the chamber during stowage or heat the propulsor and the rotor during deployment. The propulsor and the rotor are able to be stowed in the chamber in a manner that prevents build-up of ice on the propulsor and the rotor when they are not in use or operating at maximum capacity. The rotor is also able maintain heat acquired from the first configuration and be extended outside the interior space of the chamber in a non-enclosed environment via the second configuration. Waste heat may be used to provide some of the heating to improve energy efficiency. In some embodiments, chambers stowing the stowable rotors may have elements configured to move and enclose in order to stow or deploy the rotors, which may eliminate the need to place rotors on retraction devices. In some embodiments, the systems include subsystems that include propulsors, each of which may stowed in a separate chamber having a separate energy source for the heating element used to heat the chamber.

Figure 1B:
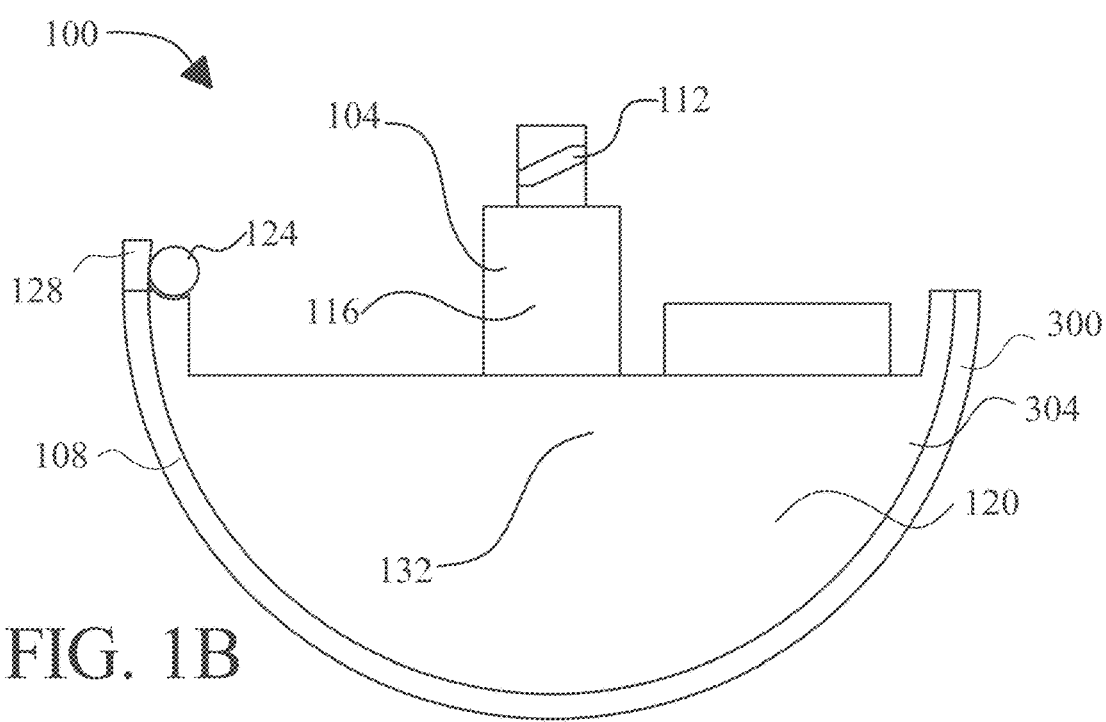

Referring now FIGS. 1A-B, an exemplary embodiment of a selectively deployable heated propulsor system 100 is illustrated. System 100 includes at least a propulsor 104 mounted on at least a structural feature 108. At least a structural feature 108 may be any portion of a vehicle incorporating system 100, including any vehicle as described below. At least a structural feature 108 may include without limitation a wing, a spar, an outrigger, a fuselage, or any portion thereof; persons skilled in the art, upon reviewing the entirety of this disclosure, will be aware of many possible features that may function as at least a structural feature 108. At least a structural feature 108 may be constructed of any suitable material or combination of materials, including without limitation metal such as aluminum, titanium, steel, or the like, polymer materials or composites, fiberglass, carbon fiber, wood, or any other suitable material. As a non-limiting example, structural feature may be constructed from additively manufactured polymer material with a carbon fiber exterior; aluminum parts or other elements may be enclosed for structural strength, or for purposes of supporting, for instance, vibration, torque or shear stresses imposed by at least a propulsor 104. Persons skilled in the art, upon reviewing the entirety of this disclosure, will be aware of various materials, combinations of materials, and/or constructions techniques.

A propulsor, as used herein, is a component or device used to propel a craft by exerting force on a fluid medium, which may include a gaseous medium such as air or a liquid medium such as water. At least a propulsor 104 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contra-rotating propellers, a moving or flapping wing, or the like. At least a thrust element may include without limitation a marine propeller or screw, an impeller, a turbine, a pump-jet, a paddle or paddle-based device, or the like. Persons skilled in the art, upon reviewing the entirety of this disclosure, will be aware of various devices that may be used as at least a thrust element. At least a thrust element may include at least a rotor 112. At least a rotor 112, as used herein, may include one or more blade or wing elements driven in a rotary motion to drive fluid medium in a direction axial to the rotation of the blade or wing element. At least a rotor 112 may include a plurality of blade or wing elements. At least a rotor 112 may include a mast or shaft coupled to the one or more blade or wing elements; mast or shaft may be driven by a motor as described in further detail below.

With continued reference to FIGS. 1A-B, at least a propulsor 104 may include at least a motor 116 mechanically coupled to the at least a rotor 112 to cause the rotor to rotate when activated. At least a motor 116 may include without limitation, any electric motor, where an electric motor is a device that converts electrical energy into mechanical energy, for instance by causing a shaft 204 to rotate. At least a motor 116 may be driven by direct current (DC) electric power; for instance, at least a motor 116 may include a brushed DC at least a motor 116 or the like. At least a motor 116 may be driven by electric power having varying or reversing voltage levels, such as alternating current (AC) power as produced by an alternating current generator and/or inverter, or otherwise varying power, such as produced by a switching power source 600. At least a motor 116 may include, without limitation, brushless DC electric motors, permanent magnet synchronous at least a motor 116s, switched reluctance motors, or induction motors. In addition to inverter and/or switching power source 600, a circuit driving at least a motor 116 may include electronic speed controllers (not shown) or other components for regulating motor speed, rotation direction, and/or dynamic braking.

With continued reference to FIGS. 1A-B, at least a motor 116 may include or be connected to one or more sensors (not shown) detecting one or more conditions of at least a motor 116; one or more conditions may include, without limitation, voltage levels, electromotive force, current levels, temperature, current speed of rotation, and the like. One or more sensors may communicate a current status of at least a motor 116 to a person operating system 100 or a computing device; computing device may include any computing device as described below in reference to FIG. 10, including without limitation a vehicle controller as set forth in further detail below. Persons skilled in the art, upon reviewing the entirety of this disclosure, will be aware of various devices and/or components that may be used as or included in a at least a motor 116 or a circuit operating a at least a motor 116, as used and described herein.

Still referring to FIGS. 1A-B, system 100 may include at least an energy source. At least an energy source may include any device providing energy to at least a propulsor 104; in an embodiment, at least an energy source provides electric energy to the at least a propulsor 104. At least an energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a capacitor, an inductor, and/or a battery. Battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, or any other suitable battery. Persons skilled in the art, upon reviewing the entirety of this disclosure, will be aware of various devices of components that may be used as at least an energy source. System 100 may include multiple propulsion sub-systems, each of which may have a separate energy source powering a separate at least a propulsor 104.

Figure 2A:
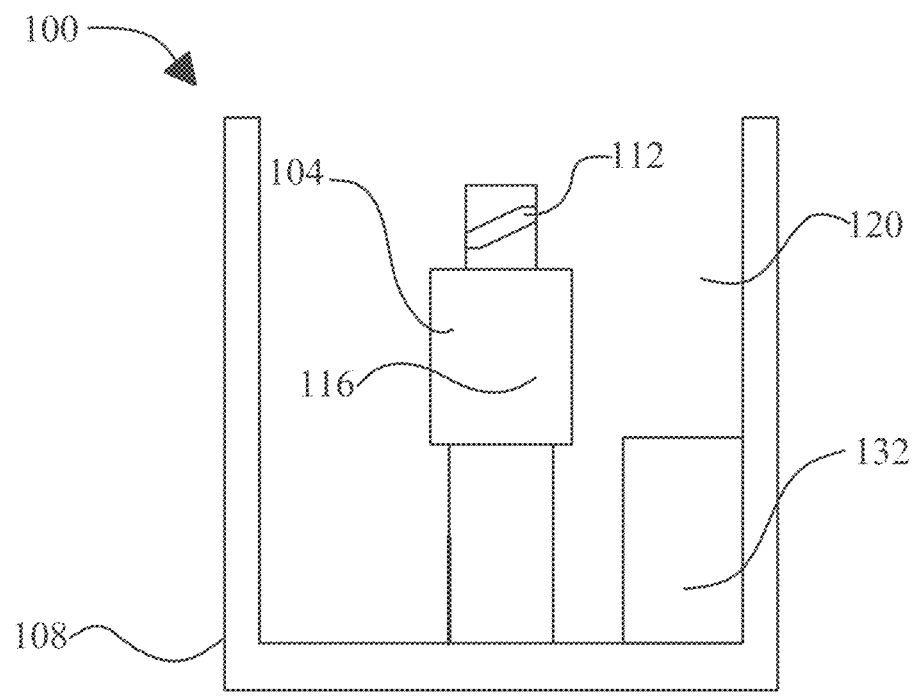
FIGS. 2A-B are schematic diagrams depicting an exemplary embodiment of the disclosed system.
Figure 2B:
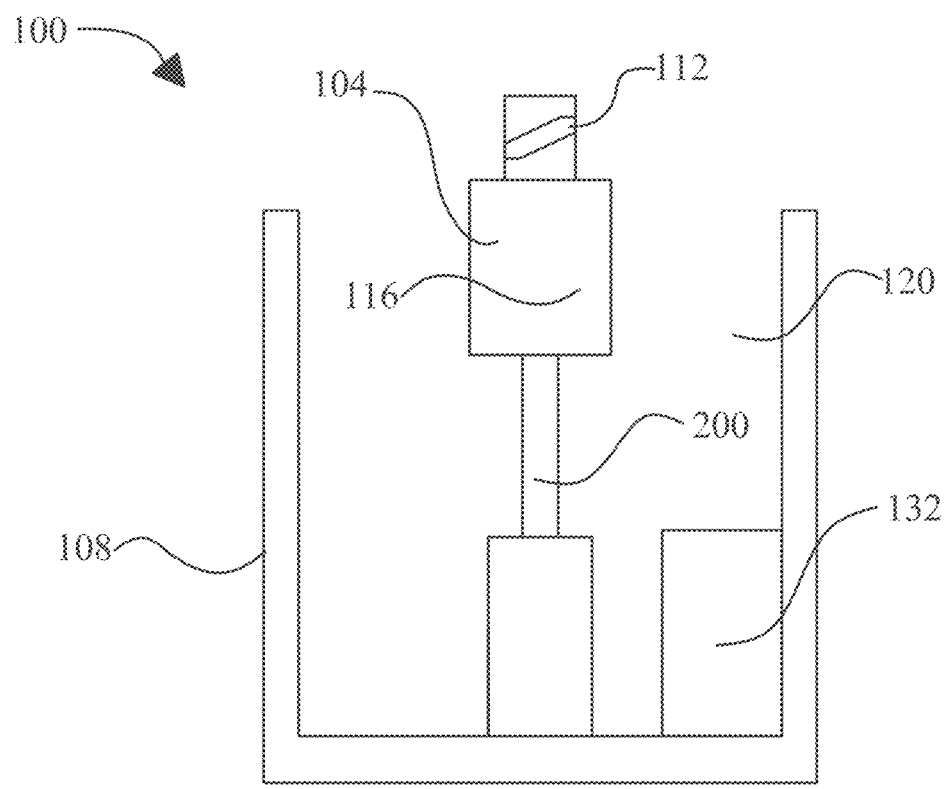

Continuing to refer to FIGS. 1A-B, system 100 includes at least a chamber 120 configured to retain the at least a propulsor 104. At least a chamber 120 may be formed to admit at least a rotor 112 as described further below. At least a chamber 120 may be attached to at least a structural feature 108; attachment may be accomplished by any feasible means, including without limitation attachment with fasteners such as screws, rivets, or bolts, attachment by adhesion, attachment by welding, or the like. At least a chamber 120 may be incorporated in at least a structural feature 108; for instance, at least a chamber 120 may include a pouch or cavity in at least a structural feature 108. In one embodiment, at least a chamber 120 may be integrated directly into a main body frame of the vehicle incorporating system 100 and manifested via an aperture configured to be enclosed in order to retain heat within the at least a chamber 120. At least a chamber 120 and the at least a propulsor 104 may be configured to move relative to one another between a first configuration in which the at least a rotor 112 is stowed within the at least a chamber 120 and a second configuration in which the at least a rotor 112 is deployed outside of the at least a chamber 120. In an embodiment, and as illustrated for instance in FIG. 2A-B, at least a propulsor 104 may include a retraction mechanism that retracts the at least a rotor 112 into the at least a chamber 120 to place the at least a rotor 112 and the at least a chamber 120 in the first configuration (as shown for instance in FIG. 2A), and extends the at least a rotor 112 out of the at least a chamber 120 to place the at least a rotor 112 and the at least a chamber 120 in the second configuration.

With continued reference to FIGS. 1A-B, in an embodiment, the retraction mechanism to retract the at least a rotor 112 may be an electric retraction mechanism configured to be controlled by the person operating system 100 or a computing device. The electric retraction mechanism may include one or more sensors configured to detect environmental features associated with the at least a propulsor 104, the at least a rotor 112, and the at least a chamber 120. For example, the electric retraction mechanism may include an environmental sensor configured to temperature, air quality, carbon monoxide, or any other gas or particular matter in air. In an embodiment, at least a motor 116 is mounted on retraction mechanism; alternatively, rotor may be mounted on retraction mechanism, and, for instance, moved into engagement with a gear mechanically coupling at least a rotor 112 to at least a motor 116 in second configuration. Retraction mechanism may be powered by any motor as described above; retraction mechanism may include a linear actuator, which may be pneumatically or hydraulically activated.

Referring now to FIGS. 3A-H, and as further illustrated in FIGS. 1A-B, at least a chamber 120 may include at least an enclosing panel configured to completely or partially enclose the interior space of at least a chamber 120. At least an enclosing panel may be configured to move between a closed position enclosing the interior space of the chamber and an opened position opening the chamber and exposing the interior space. In an embodiment, the at least an enclosing panel may be configured to support a partially closed configuration for releasing excess heat or any undesired matter unintentionally stowed in the at least a chamber 120. As used herein, at least a chamber 120 is closed where air in the chamber is physically and/or thermally isolated from air outside the at least a chamber 120; where the at least a chamber 120 is closed, at least a chamber 120 may be airtight, or may be sufficiently enclosed to prevent significant losses of heat due to convection, in a manner analogous to a car cabin or house with doors and windows closed. At least a chamber 120 may be open when not in a closed state.

Continuing to refer to FIGS. 3A-H, at least an enclosing panel may function to close at least a chamber 120 when at least a rotor 112 is retracted, where at least a rotor 112 is on a retraction mechanism as described above in reference to FIGS. 2A-B. At least an enclosing panel is configured to move, retract, slide, or perform any other applicable movement in order to place the at least a chamber 120 and the at least a rotor 112 in the first configuration when the at least an enclosing panel is in the closed position and to place the at least a chamber 120 and at least a rotor 112 in the second configuration when the at least an enclosing panel is in the open position; in an embodiment, at least a rotor 112 may not be mounted on a retraction mechanism, so that motion of at least an enclosing panel is the sole motion required to move at least a rotor 112 and at least a chamber 120 between first configuration and second configuration. In an embodiment, at least an enclosing panel may be flat, curved, or any other applicable shape, and be made up of any suitable material or combination of materials, including without limitation metal such as aluminum, titanium, steel, or the like, polymer materials or composites, fiberglass, carbon fiber, wood, or any other suitable material. In an embodiment, in the first configuration, the at least an enclosing panel is configured to be extended from a portion 128, above the at least a rotor 112 and parallel to an at least a heating element 132, until the interior space of at least a chamber 120 is enclosed. In the second configuration, the at least an enclosing panel may be stowed in a cavity or pocket included in the at least a structural element or any other component of system 100. The cavity or pocket is configured to retain the at least an enclosing panel and a coupled electric motor or other applicable power source configured to support transitions of the at least an enclosing panel from first configuration to second configuration, and second configuration to first configuration. As a non-limiting example, at least an enclosing panel 300 may be constructed from additively manufactured polymer material with a carbon fiber exterior; aluminum parts or other elements that support a combination of agility and strength, or for purposes of supporting, for instance, vibration, torque or shear stresses imposed by flight turbulence.

Continuing to refer to FIGS. 3A-H, in an embodiment, at least an enclosing panel may comprise a sliding mechanism, hinging mechanism, retraction mechanism, or any other applicable mechanism configured to be coupled to the electric motor within system 100 in order to allow a user or computing device associated with system 100 to control the movement of at least an enclosing panel. For example, a user of system 100 or a computing device may switch between first configuration, in which the at least an enclosing panel emerges out of the cavity or pocket and extends over or across the at least a chamber 120 until it is fully enclosed, and second configuration, in which the at least an enclosing panel retracts back into the cavity or pocket fully exposing the at least a chamber 120.

Still viewing FIGS. 3A-H, at least an enclosing panel 300 may include a rotor cover (not shown) configured to cover at least a rotor 112 and enclose the at least a rotor 112 to place the at least a rotor 112 and the at least a chamber 120 in the first configuration when in the closed state, and remove or retract in order to expose the at least a rotor 112 to place the at least a rotor 112 and the at least a chamber 120 in the second position when in the open state. At least a chamber 120 may include at least a first chamber section 304 that remains stationary relative to at least a propulsor 104. The rotor cover may rotate, slide, or move linearly to expose or cover at least a rotor 112. As a non-limiting example, and as illustrated for instance in FIGS. 3A-B, at least a first chamber section 304 may partially house at least a propulsor 104 while leaving rotor exposed; at least an enclosing panel 300 may, for instance, be an element that displaces vertically (FIG. 3B) to expose at least a rotor 112. Vertical displacement may be accomplished using any means suitable for retraction mechanism as described above, including a pneumatic or hydraulic actuator or other motorized device; vertical displacement may free rotor to rotate between at least a rotor 112 cover and at least a first chamber section 304.

Figure 3A:
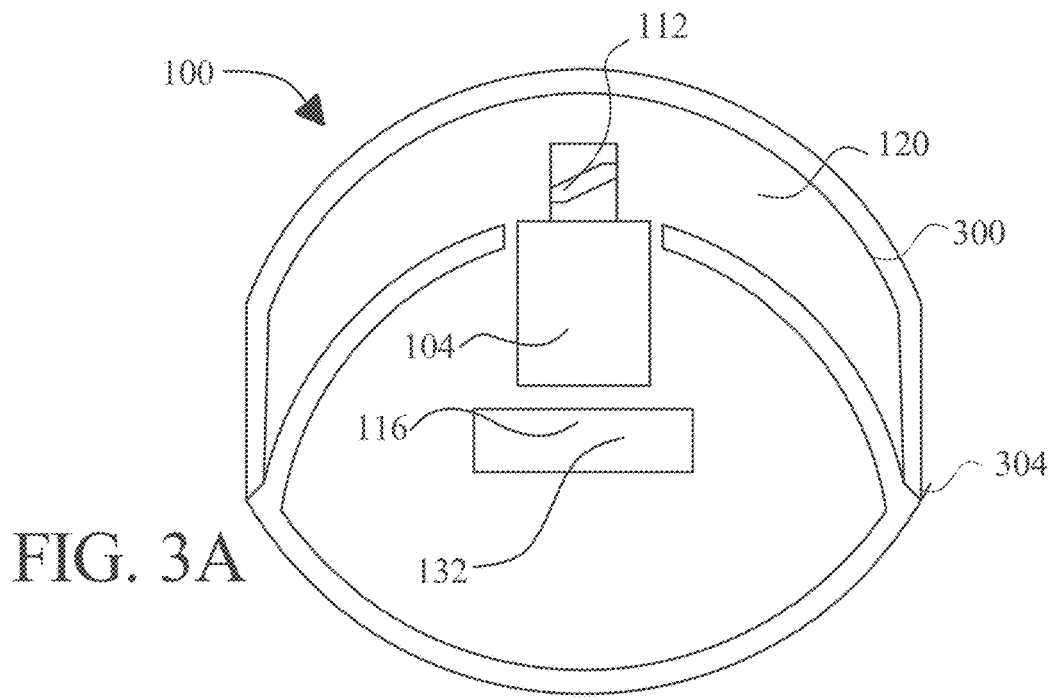
FIGS. 3A-H are schematic diagrams depicting an exemplary embodiment of the disclosed system.
Figure 3B:
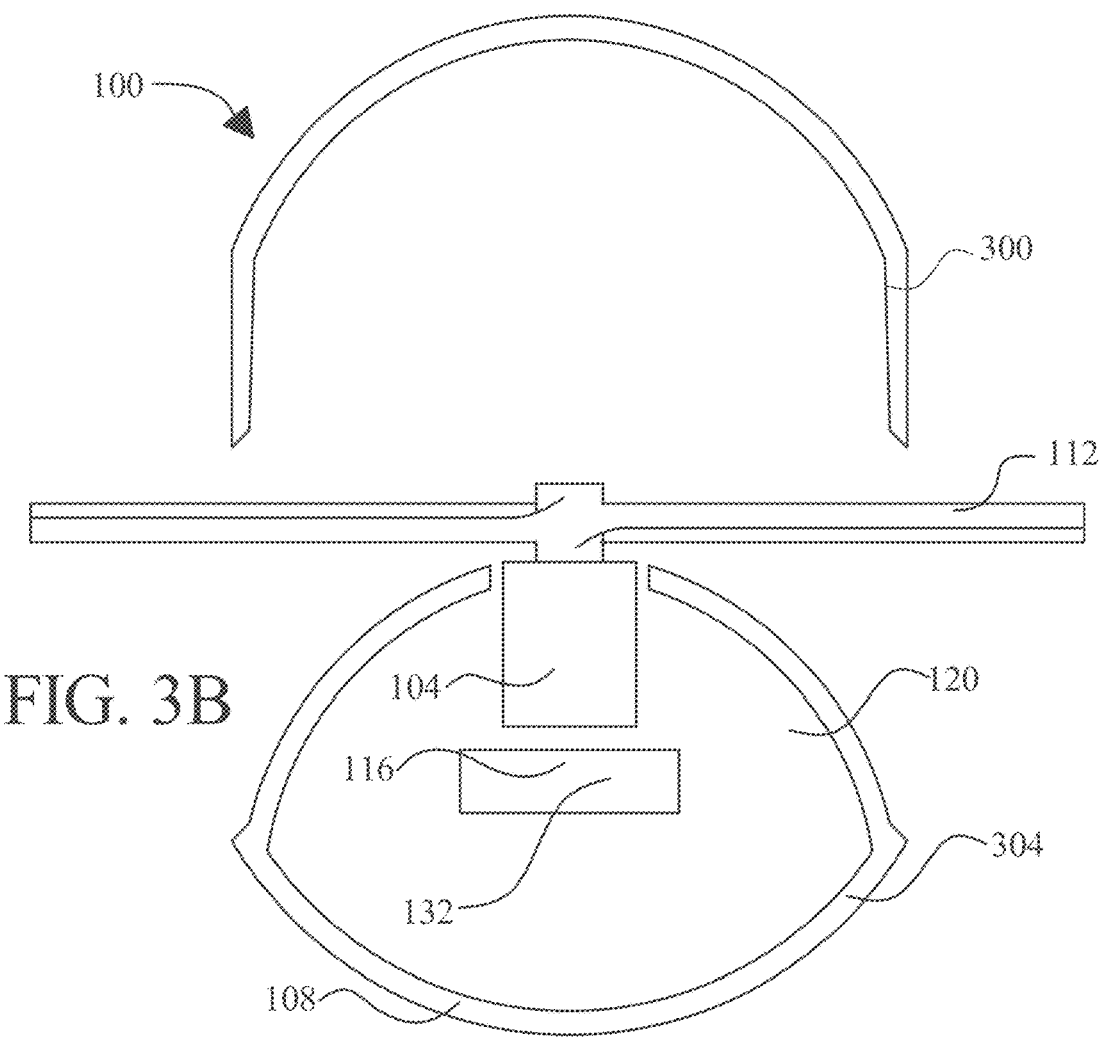
Figure 3C:
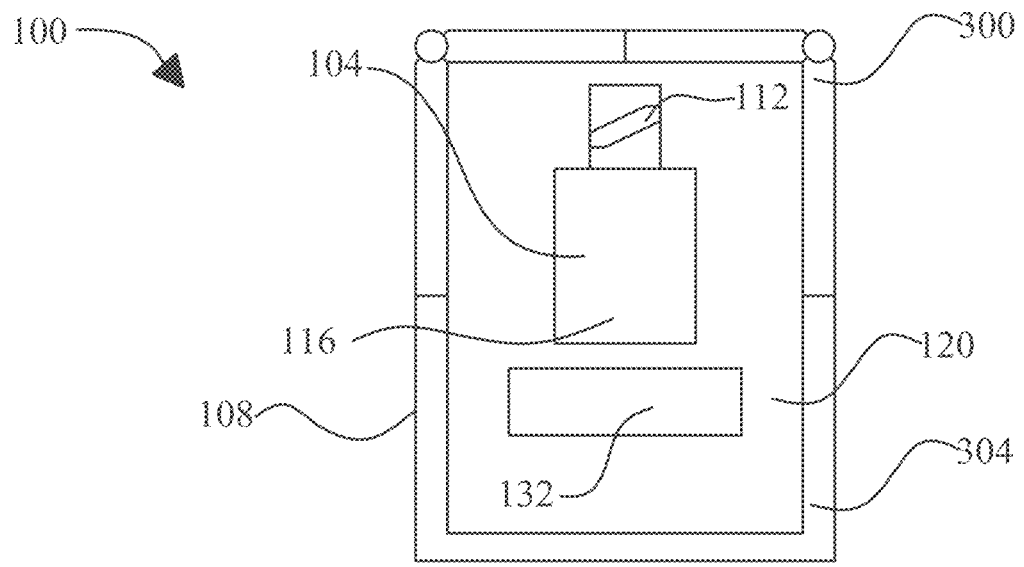
Figure 3D:
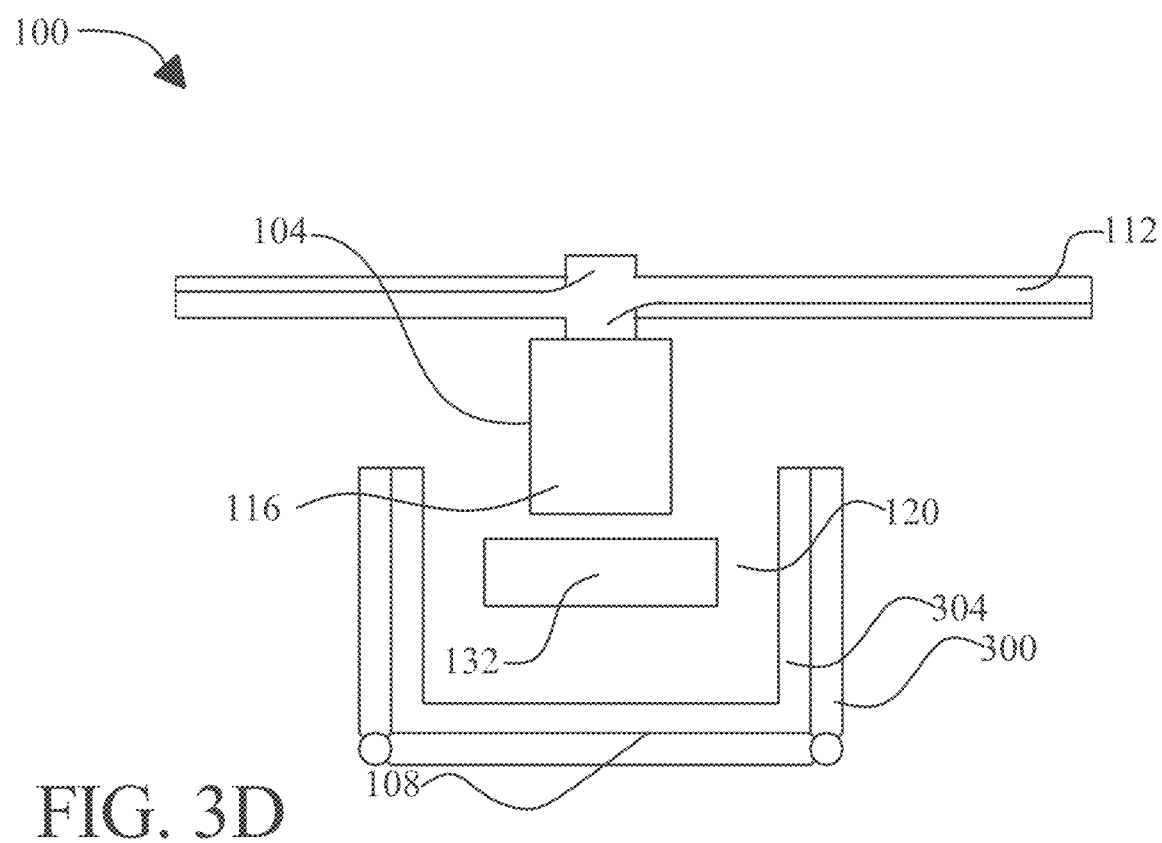
Figure 3E:
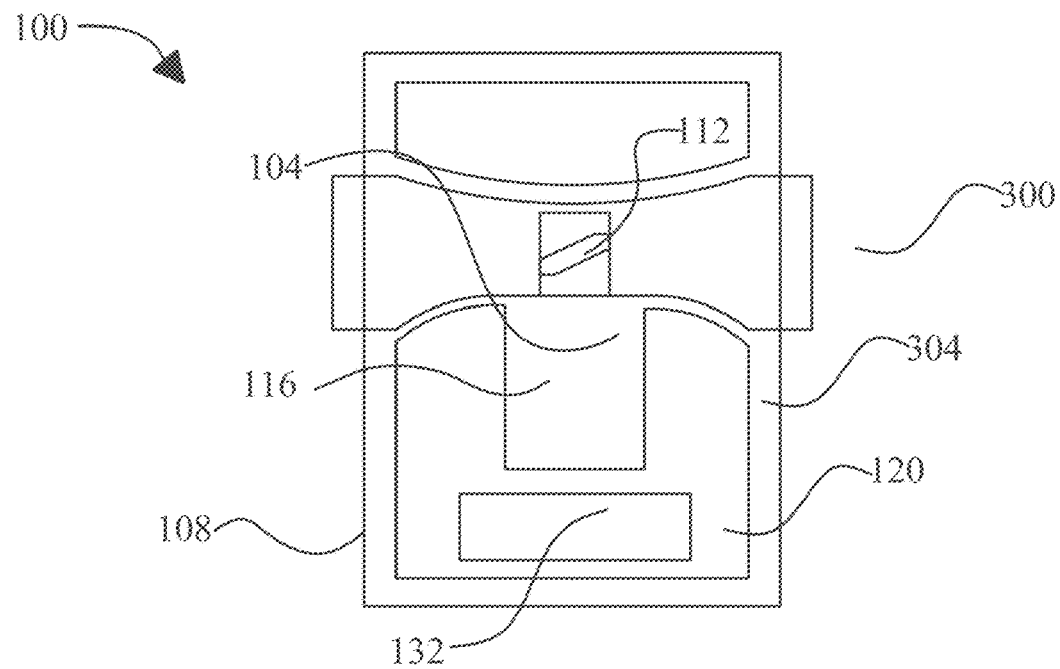
Figure 3F:
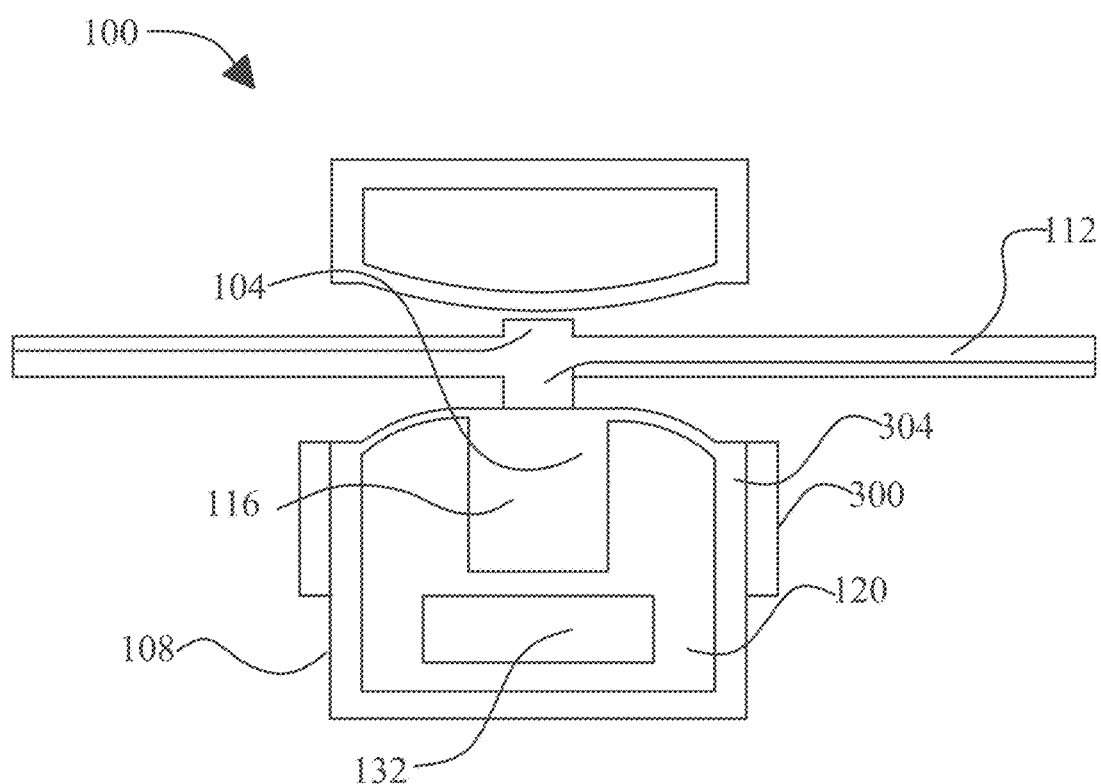
Figure 3G:
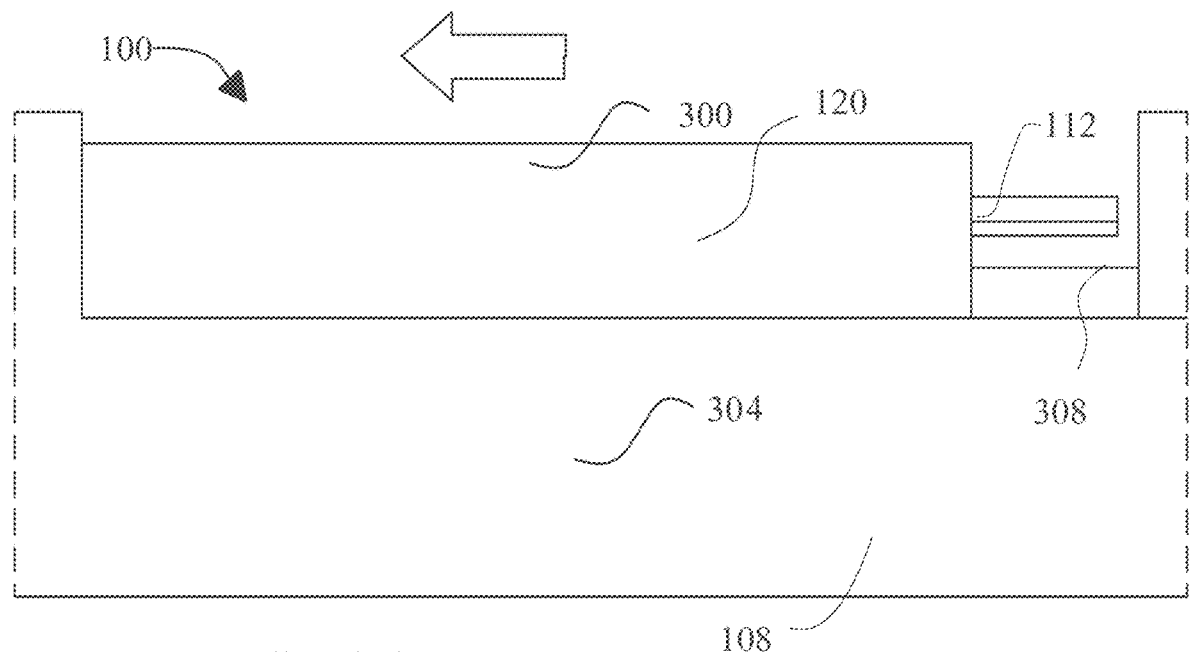
Figure 3H:
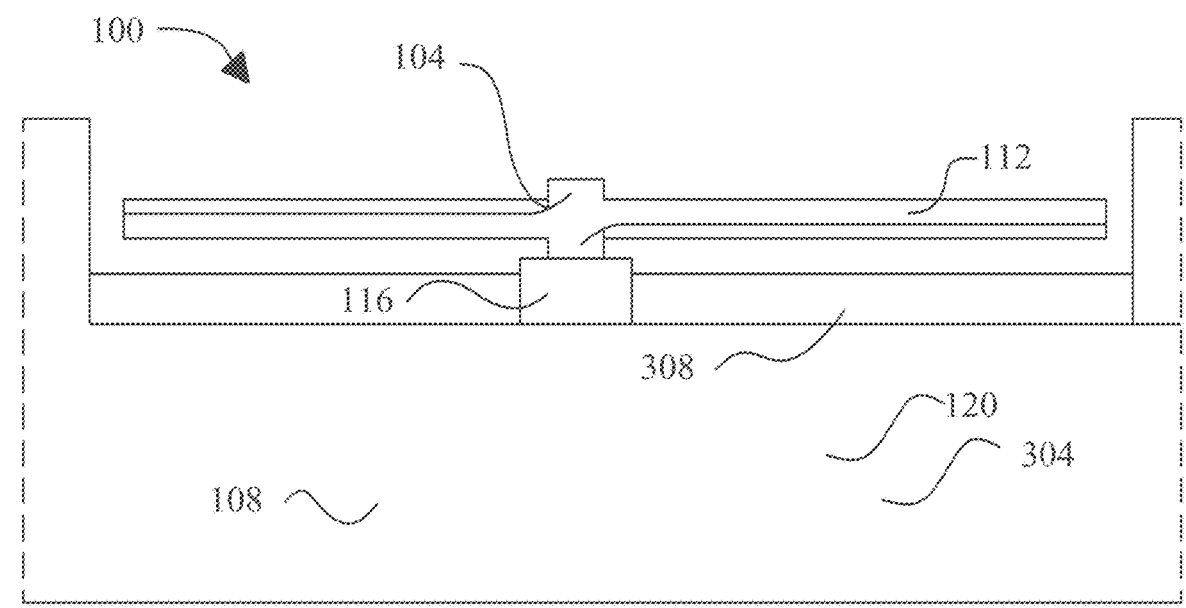

Still viewing FIGS. 3A-H, as another non-limiting example illustrated in FIGS. 3C-D, at least a rotor 112 cover may be hinged on one or two sides, rotating away from at least a first chamber section 304 to expose the at least a rotor 112. As a further non-limiting example illustrated for exemplary purposes in FIGS. 3E-F, at least a first chamber section 304 may be a mostly enclosed chamber having two lateral apertures; the rotor cover may include two sliding or hinged doors that can cover the two lateral apertures to enclose the at least a rotor 112 or uncover the two lateral apertures to allow the at least a rotor 112 to rotate through the two lateral apertures. As illustrated for instance in FIGS. 3G-H, where at least a first chamber section 304 partially encloses at least a propulsor 104 while exposing at least a rotor 112, at least a rotor 112 cover may slide laterally to either cover or expose rotor.

Still viewing FIGS. 3A-F, in some embodiments system 100 includes at least a nacelle cover 308 that covers an otherwise exposed portion of at least a chamber 120 when at least a chamber 120 and at least a propulsor 104 are in the second configuration. At least a nacelle cover 308 may be a structure presenting an aerodynamically formed surface redirecting downdraft from at least a propulsor 104 around a portion of at least a chamber 120. At least a nacelle cover 308 may be formed of any material or materials suitable for formation of at least a structural element 108. At least a nacelle cover 308 may include an opening through which a shaft supporting at least a rotor 112 and/or a portion of at least a propulsor 104 may pass. Opening may be partially or wholly sealed; opening may permit passage of air for convection purposes from one side to another of at least a nacelle cover 308 for the purposes of heating at least a chamber 120. Opening may be substantially sealed, and heating element may be on a rotor side of at least a nacelle cover 308, such as an inductive or magnetically coupled heating element in at least a rotor as described below, or any heating element connected to a heat conduit as described below. At least a nacelle cover 308 may include a part of at least an enclosing panel 300; for instance, at least a moveable part 300 may reclose under at least a rotor 112. Persons skilled in the art, upon reviewing the entirety of this disclosure, will be aware of various forms at least a nacelle cover 308 may take to perform consistently with the description herein. At least a nacelle cover 308 may redirect downdrafts as well as updrafts or any other passage of air around or at chamber 120, in any configuration as described herein.

Figure 4A:
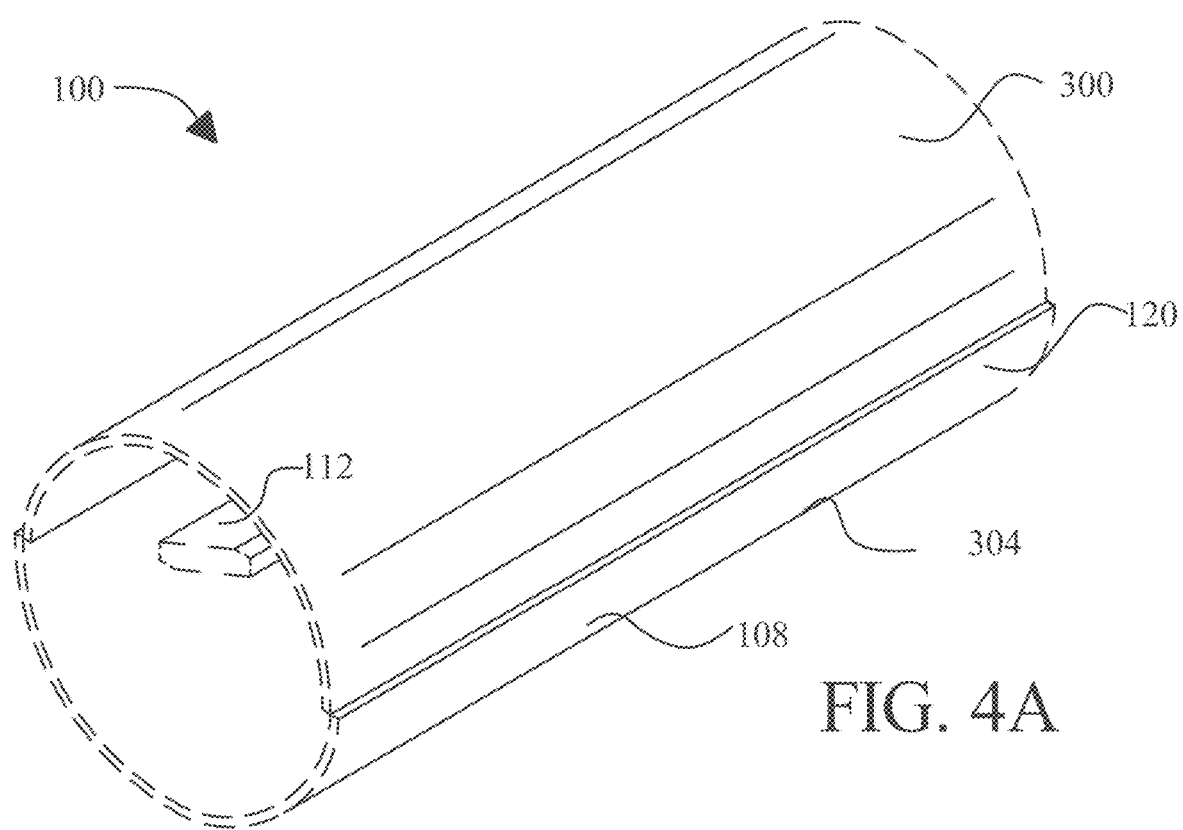
FIGS. 4A-B are schematic diagrams depicting an exemplary embodiment of the disclosed system.
Figure 4B:
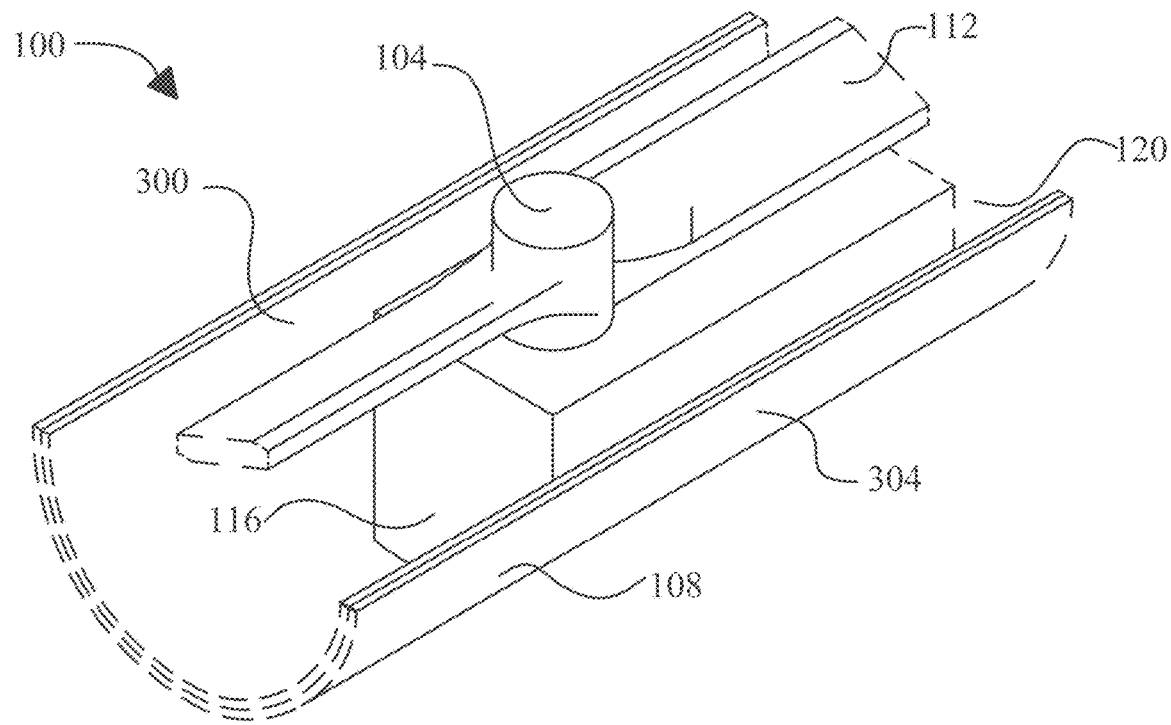

As illustrated for example in FIGS. 1A-B, in an embodiment the at least a rotor 112 may have a plane of rotation; at least a first chamber section 304 may remain on a first side of the plane of rotation in each of the first configuration and the second configuration, and at least a second chamber section that includes the at least a rotor 112 cover, wherein the second chamber section is located on a second side of the plane of rotation when the at least a rotor 112 and the at least a chamber 120 are in the first configuration, and the second chamber section is located on the first side of the plane of rotation when the at least a rotor 112 and the at least a chamber 120 are in the first configuration. As a non-limiting example, the at least a chamber 120 may be substantially cylindrical, and the at least a second chamber section may include a longitudinal cylindrical shell section, defined as a section of a cylindrical shell having two edges in a generally arc shape defining a portion of an end of a cylindrical shell and two edges substantially parallel to a central axis of the cylindrical shell, slidably engaged to the at least a first chamber section 304, and the at least a second chamber is slidably movable between the first side of the plane of rotation and the second side of the plane of rotation. A motor may power the rotational sliding motion of the longitudinal cylindrical shell section; as a non-limiting example, the motor may drive a gear wheel 124 engaged to a portion 128 of at least a rotor 112 cover, which may include, for instance, a substantially arc-shaped extension of the shell, such that rotation of the gear wheel 124 causes rotation and sliding motion of the longitudinal cylindrical shell section. Persons skilled in the art, upon reviewing the entirety of this disclosure, will be aware of various alternative ways to motorize or actuate the movement of rotor cover, as well as various alternative forms that may be used instead of and consistently with the above-described exemplary forms. FIGS. 4A-B are exemplary isometric illustrations of a partially cut-away version of at least a chamber 120 and propulsor.

Figure 5A:
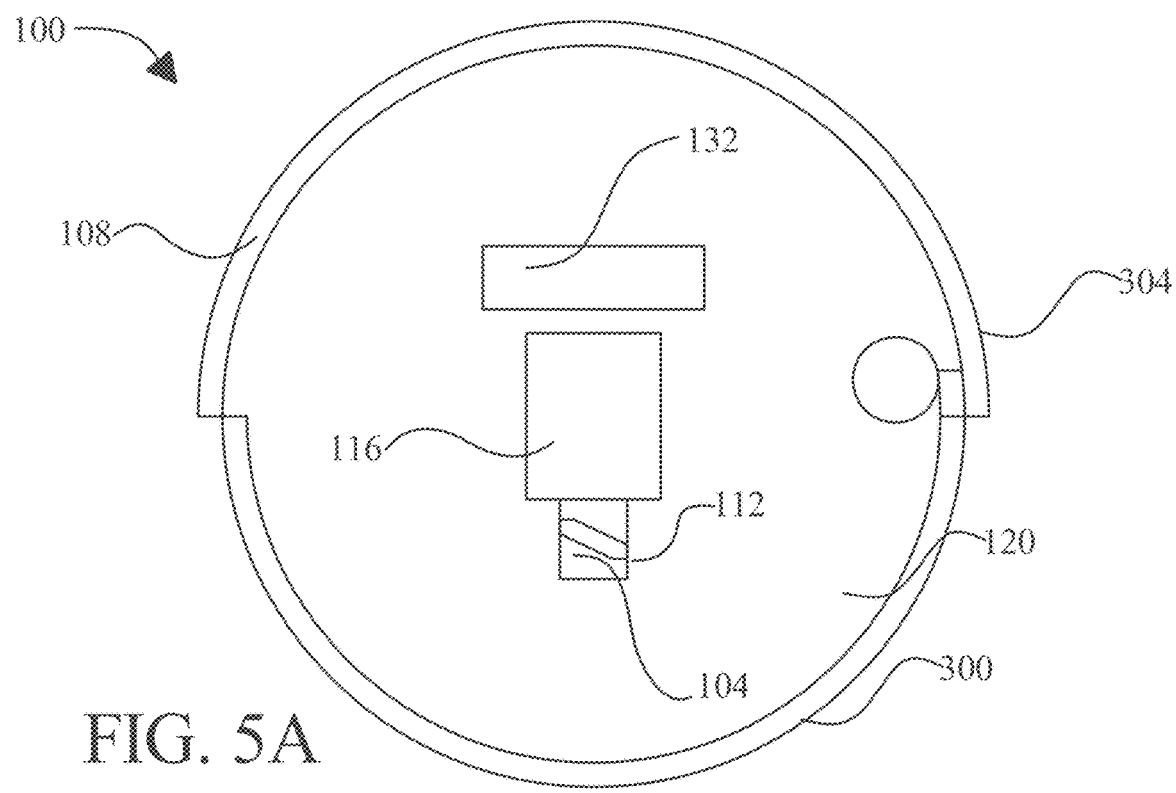
FIGS. 5A-B are isometric diagrams depicting an exemplary embodiment of a portion of the disclosed system.
Figure 5B:
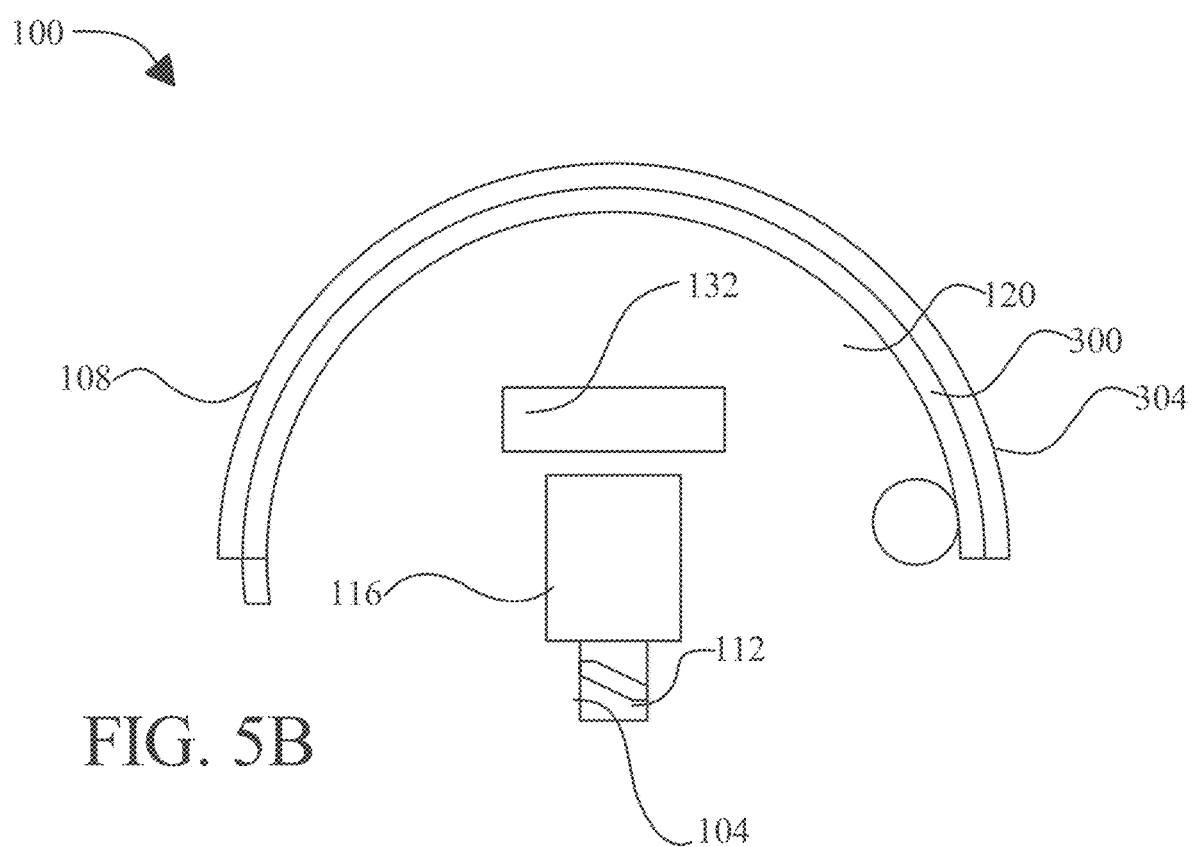

In each of the above-described examples, at least a first chamber section 304 has been shown disposed below at least a rotor 112; however, in an embodiment, and as illustrated in FIGS. 5A-B, at last a first chamber section 304 may be disposed above rotor, with an opening in chamber defined by placement of at least a chamber 120 and at least a rotor 112 in second configuration faces downward; in such an embodiment, opening may function as a drainage opening, permitting fluids that have gathered in chamber via condensation, melting, or other processes to be discarded. Drainage opening may alternatively or additionally include a slot or hole in chamber, which may be selectively closeable.

Referring again to FIGS. 1A-B, system 100 may include at least a heating element 132 thermally connected to the at least a chamber 120. At least a heating element 132 may apply heat to any part of at least a chamber 120 or at least a propulsor 104. In an embodiment, at least a heating element 132 may heat air within the at least a chamber 120 when the at least a chamber 120 is in the closed position; in other words, when at least a propulsor 104 and at least a chamber 120 are in first configuration, at least a chamber 120 may define at least a cavity containing at least a propulsor 104, and at least a heating element 132 may act to heat air contained in the at least a cavity.

Figure 6A:
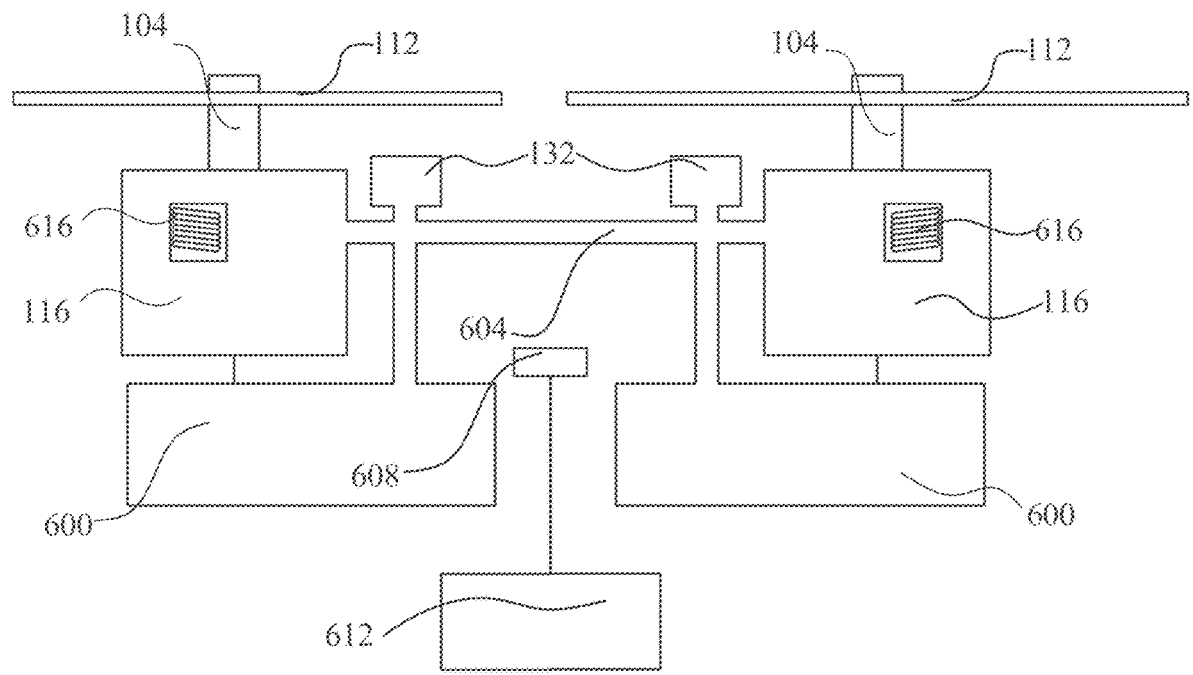
FIG. 6A is a block diagram depicting an exemplary embodiment of a portion of the disclosed system.

Still referring to FIGS. 1A-B, at least a heating element 132 may have any suitable form and may include any component or components useful for heating at least a chamber 120 and/or at least a propulsor 104. As a non-limiting example, at least a heating element 132 may include at least a resistive heating element 132. At least a resistive heating element 132 may be an electrical component that conducts electricity in an energy-inefficient manner, converting electrical energy into heat using a similar mechanism to an electric stove, incandescent light bulb, or "space heater." At least a heating element 132 may include an element that heats the at least a chamber 120 and the at least a propulsor 104 using waste heat from at least a vehicular component. "Waste heat," as used herein, is heat produced as a byproduct of the intended purpose of a component, and thus typically represents lost energy in a component; for instance, a motor, as described above, will convert a certain proportion of electrical energy supplied thereto into kinetic energy, which is the intended function of the motor, and will also convert a certain proportion of the electrical energy into heat, which is not an intended function of the motor. Similarly, electrical lighting elements give off some heat as well as light, and many electrical components containing multiple circuit elements, such as inverters, logic circuits, microprocessors, and transformers, also produce heat when in use. Referring now to FIG. 6A, in an embodiment, at least a vehicular may include one or more elements of at least a propulsor 104, including at least a motor 116, an inverter, or a power source 600. At least a vehicular component may include one or more additional elements of a vehicle in which system 100 is incorporated, including without limitation power source 600s, motors, other rotors (including "main" rotors), inverters, computing devices/flight controllers, and the like. At least a vehicular component may be inside at least a chamber 120 when in first configuration, enabling at least a vehicular component to heat air within at least a chamber 120, at least a chamber 120, and/or at least a propulsor 104 directly; for instance, at least a vehicular component may include a motor, power source 600, or inverter coupled to at least a propulsor 104. Alternatively or additionally, heating element 132 may include at least a heat conduit 604 for transporting heat from another portion of system 100 and/or a vehicle incorporating system. At least a heat conduit 604 may include any active or passive component usable to transport heat from one component to another, including without limitation a tube or passage permitting air or fluid to travel by convection, a tube or passage of air or fluid that gets pumped or otherwise circulated, a strip or other piece of thermally conducting material such as a "heat sink," or any combination thereof. At least a heat conduit 604 may include a heat pipe, defined as a conduit that transports heat using a material chosen to go through phase changes between liquid and gaseous phases at an applicable range of temperatures; material may change into gaseous form in contact with a hotter element, moving through gaseous expansion or the like to another part of the conduit in contact with a cooler element, whereupon it may condense, returning to the hot element again via capillary action, gravity, or other forces or means. At least a heat conduit 604 may include at least a waste heat conduit, which may be any heat conduit that transfers heat from a component producing waste heat to another location within system 100 and/or a vehicle containing system. At least a heating element 132 may include one or more one or more heat exchangers (not shown) at a chamber of at least a chamber 120/a propulsor of at least a propulsor 104 to transfer heat between at least a heat conduit 604, at least a propulsor 104, at least a chamber 120, and/or other elements.

Still viewing FIG. 6A, system 100 may include at least a temperature sensor 608, defined as any device that detects absolute or relative temperature of one or more items, which may include air within at least a chamber 120, at least a chamber 120, at least a propulsor 104, and/or at least a rotor 112. At least a temperature sensor 608 may further detect temperature of one or more vehicular components. At least a temperature may be a temperature sensor that produces or modifies an electric signal, including without limitation a switch closed by thermal expansion and/or contraction, a thermistor, and/or a thermoelectric component. System 100 may include at least a control circuit. At least a control circuit 612 may include one or more analog or digital components that receive one or more inputs from sensors, a clock, memory and/or other elements to produce control signals to one or more elements or components of system 100 and/or vehicle. At least a control circuit 612 may include without limitation one or more analog elements such as diodes, amplifiers, comparators, transistors, or the like; at least a control circuit 612 may include an analog computer and/or any element thereof. At least a control circuit 612 may include without limitation one or more digital or logical circuit elements, such as logic gates, multiplexors or demultiplexors, read-only memory, or other memory devices such as registers; at least a control circuit 612 may include a digital computing device including without limitation a microprocessor, microcontroller, or any component thereof. In an embodiment, at least a temperature sensor 608 may be located in at least a chamber 120, and a user of system 100 or a computing device may be able to determine one or more threshold temperatures in which if the one or more threshold temperatures are exceeded then the at least an enclosing panel 300 is automatically triggered. For example, if at least a temperature sensor 608 or any other sensor in system 100 determines that the at least a propulsor 104 and/or at least a rotor 112 have endured too low of a temperature attributed to the buildup of ice and have exceeded a threshold temperature when the at least a propulsor 104 and at least a rotor 112 are in the second configuration, then system 100 automatically makes a determination to switch to the first configuration in which at least a propulsor 104 and at least a rotor 112 are retracted into the interior space of the at least a chamber 120 and the at least an enclosing panel 300 protrudes until the at least a chamber 120 is fully enclosed. In another example, if at least a temperature sensor 608 or any other sensor in system 100 determines that the temperature inside of the at least a chamber 120 is too high and the threshold temperature has been exceeded, then system 100 automatically retracts the at least an enclosing panel 300 partially in order to reduce the internal temperature of the at least a chamber 120 below the threshold temperature.

With continued reference to FIG. 6A, at least a control circuit 612 may include or communicate with a vehicle controller. Vehicle controller may include any computing device or combination of computing devices as described below in reference to FIG. 10. Vehicle controller may include any processor or combination of processors as described below in reference to FIG. 10. Vehicle controller may include a microcontroller. In an embodiment, where system 100 is incorporated in an electronic aircraft as described in further detail below, vehicle controller is programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Vehicle controller may be designed and configured to operate electronic aircraft via fly-by-wire. Vehicle controller is communicatively coupled to each propulsor of the at least a propulsor 104 along with each sensor of system 100; as used herein, vehicle controller is communicatively coupled to each propulsor where vehicle controller is able to transmit signals to each propulsor and each propulsor is configured to modify an aspect of propulsor behavior in response to the signals. As a non-limiting example, vehicle controller may transmit signals to a propulsor via an electrical circuit connecting vehicle controller to at least a propulsor 104; the circuit may include a direct conductive path from vehicle controller to at least a propulsor 104 or may include an isolated coupling such as an optical or inductive coupling. Alternatively or additionally, vehicle controller may communicate with a propulsor of at least a propulsor 104 using wireless communication, such as without limitation communication performed using electromagnetic radiation including optical and/or radio communication, or communication via magnetic or capacitive coupling. Persons skilled in the art will be aware, after reviewing the entirety of this disclosure, of many different forms and protocols of communication that may be used to communicatively couple vehicle controller to at least a propulsor 104. In an embodiment, vehicle controller is configured to be communicatively coupled to the rotor cover, the retraction mechanism, and the at least an enclosing panel providing a user of system 100 with access to information associated with the previously mentioned components, such as component conditions, temperature, etc., along with control and/or an opportunity to provide preferences for controlling components of system 100. Vehicle controller may include or be communicatively coupled to a graphical user interface allowing a user of system 100 to provide inputs such as preferences for temperature thresholds, timers associated with maintaining configurations, and other relevant preferences associated with the functioning of components of system 100.

Still viewing FIG. 6A, at least a control circuit 612 and/or vehicle controller may receive inputs from and/or transmit control signals to system 100. As a non-limiting example, at least a control circuit 612 and/or vehicle controller may be electrically coupled to at least a temperature sensor 608. At least a control circuit 612 and/or vehicle controller may be configured to compare the temperature to a target value and generate a control signal to one or more elements of system 100 and/or vehicle. In an embodiment, control signal may modify a heat output of the at least a heating element 132; for instance, at least a control circuit 612 may detect, via at least a temperature sensor 608, that a temperature of a propulsor, a chamber, and/or air within the chamber has reached a target level, and may generate a control signal conferring a reduced amount of heat to that propulsor, chamber, or air within chamber. As a further non-limiting example, at least a control circuit 612 and/or one or more sensors may detect that a temperature of a propulsor, chamber, or air within chamber has dropped below a threshold amount which may be the same or similar to the above-mentioned target temperature, or may be offset somewhat to permit hysteresis and prevent oscillation of control signals, and may generate a control signal to provide more heat to that propulsor, chamber, or air within chamber. The above-described examples may be combined; for instance, heat may be reduced for an element or transported away from the first element when above a certain temperature and may be transported to a second element having a lower detected temperature, or a higher tolerance for heat. Heat may further be transported to one or more portions of system 100 and/or vehicle incorporating system, such as one or more leading edges of airfoils, rotors, or other components that lose heat to passing air.

Still referring to FIG. 6A, at least a heating element 132 may heat the at least a chamber 120 and at least a rotor 112 when the at least a chamber 120 and the at least a propulsor 104 are in the first configuration. In an embodiment, heating the at least a chamber 120 and at least a rotor 112 when in second configuration may prevent ice buildup on an exterior of the at least a chamber 120 from preventing at least a chamber 120 from opening, while stowing the at least a rotor 112 in at least a chamber 120 when not in use may prevent ice buildup on the at least a rotor 112 and/or at least a propulsor 104. Heating the at least a chamber 120 and at least a rotor 112 may also cause the at least a rotor 112, when deployed, to be preheated, further preventing, delaying, or alleviating ice buildup on the at least a rotor 112 during use. Moreover, upon return to first configuration after use, at least a rotor 112 and/or at least a propulsor 104 may be de-iced and then heated again by the heated at least a chamber 120, preparing them for a future deployment; at least a drainage opening may be used to dispose of fluid thus produced, including water from melted ice; this may be accomplished by a control circuit as described above briefly reopening, via at least an enclosing panel, at least a chamber 120 to allow fluid to fall out, or by opening closable drainage openings distributed throughout system 100 for the same purpose.

With continued reference to FIG. 6A, system 100 may include at least an inductive heater 616 configured to heat one or more elements of system 100 and/or vehicle; for instance, and without limitation, at least an inductive heater 616 may be configured to heat at least a rotor 112. An inductive heater, as used herein, includes an electromagnet and a control circuit configured to provide a varying magnetic field to a component to be heated, inducing eddy currents in the element to be heated, which is then heated by resistive heating. Varying magnetic field provided to the element to be heated may be accomplished by varying the magnetic field produced by the electromagnet, for instance, by providing to the electromagnet a varying voltage signal. Alternatively or additionally, magnetic field to which component to be heated is exposed may be varied by motion of the component; for instance, at least a rotor 112, when rotating to produce thrust, may pass rapidly in and out of a magnetic field produced by electromagnet, thus varying the magnetic field to which at least a rotor 112 is exposed, and generating eddy currents. In an embodiment, inductive heater is used to heat at least a rotor 112 while deployed; this may be used to supplement heating using at least a chamber 120 and at least a heating element 132. In an embodiment, inductive heater 616 may be used where at least a rotor 112 is made of or coated with a substantially conducting material such as carbon fiber.

Figure 6B:
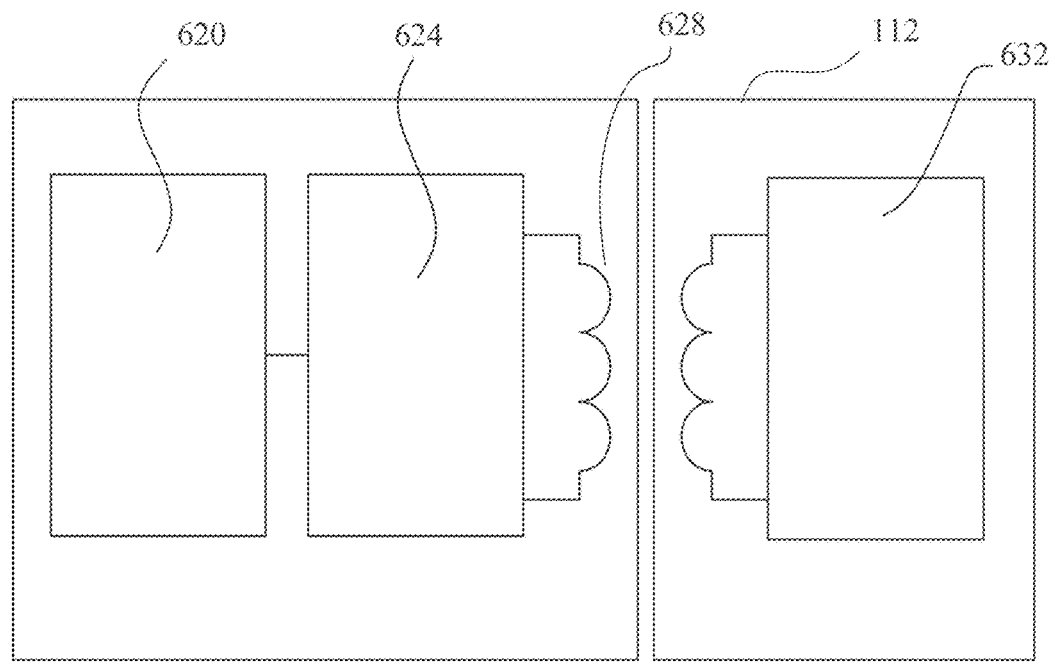
FIG. 6B is a block diagram depicting an exemplary embodiment of a magnetically coupled heating circuit that may be installed in the disclosed system.

Referring to FIG. 6B, at least a rotor may alternatively or additionally be heated using a magnetically coupled heating element. In an embodiment, a power source 620, which may be any power source as described above, may be located exterior to at least a rotor 112, for instance in at least a motor 116, at least a chamber 120, or any other useful location on a vehicle incorporating system 100. At least a power source 620 may be coupled to a power converter 624 driving a magnetic coupling 628 to a circuit installed in at least a rotor 112. Magnetic coupling may include, as a non-limiting example, a first set of coils outside of at least a rotor 112, magnetically coupled to a second set of coils in at least a rotor 112. Circuit in at least a rotor 112 may be connected to a resistive heating element 632 embedded in at least a rotor; resistive heating element 632 may include any resistive heating element as described above. Power converter 624 may drive current through first set of coils, inducing current in second set of coils, which resistive heating element 632 may convert to heat in at least a rotor 112. In an embodiment, each at least a chamber 120 of system 100 may include a plurality of sealable openings configured to share or exchange heat retained in each at least a chamber 120 via a plurality of passageways integrated into a vehicle incorporating system 100.

Referring again to FIG. 6A, at least a control circuit 612 may further be configured to detect a change in flight conditions and move at least a propulsor 104 and at least a chamber 120 between first configuration and second configuration. Detecting at least a change in flight condition may include determining that flight is entering a planned or programmed phase of flight in which more or less thrust is required; for instance, a vehicle incorporating system 100 may be at a takeoff, landing, or hover phase of flight as dictated by a flight plan, which may be stored in memory accessible to at least a control circuit. Memory may be supplemented by sensor input or feedback from a person or device on the ground or in the vehicle; for instance, flight plan may call for detection of an exterior signal indicating that takeoff or landing is permitted or indicating a position of landing location, or for a determination of a location for landing using such facilities as the Global Positioning System (GPS). Alternatively or additionally, sensor input may be used directly to detect, for instance, a loss of altitude, a loss of airspeed, or a stall condition indicating that landing is occurring, an increase in altitude, or airspeed indicating that a takeoff process is coming to an end, an increase in turbulence or decrease in stability, or the like. Control signal may activate a motor or actuator to move at least a rotor 112 and at least a chamber 120 between first configuration and second configuration as called for in the situation; for instance, detection by at least a control circuit 612 of a change in flight condition indicating a need for greater thrust may result in production of a control signal that puts at least a rotor 112 and at least a chamber 120 in second configuration, whereas detection that a change in flight condition has given rise to a decreased need for thrust may produce a control signal moving at least a rotor 112 and at least a chamber 120 into second configuration. Persons skilled in the art, upon reviewing the entirety of this disclosure, will be aware of various examples for flight condition detection and control signal generation that may be employed consistently with the description herein.

Still viewing FIG. 6A, in an alternative embodiment, system 100 may not include at least a heating element 132. In other words, system 100 may be a selectively deployable propulsor system, including at least a propulsor 104, as described above mounted on at least a structural feature 108, and at least a chamber 120 as described above at the at least a propulsor 104; the at least a chamber 120 may include at least an enclosing panel as described above movable between a first position placing the at least a chamber 120 and the at least a rotor 112 in a first configuration in which the at least a rotor 112 is stowed within the at least a chamber 120 and a second position placing the at least a chamber 120 and the at least a rotor 112 in a second configuration in which the at least a rotor 112 is deployed outside of the at least a chamber 120.

Figure 7:
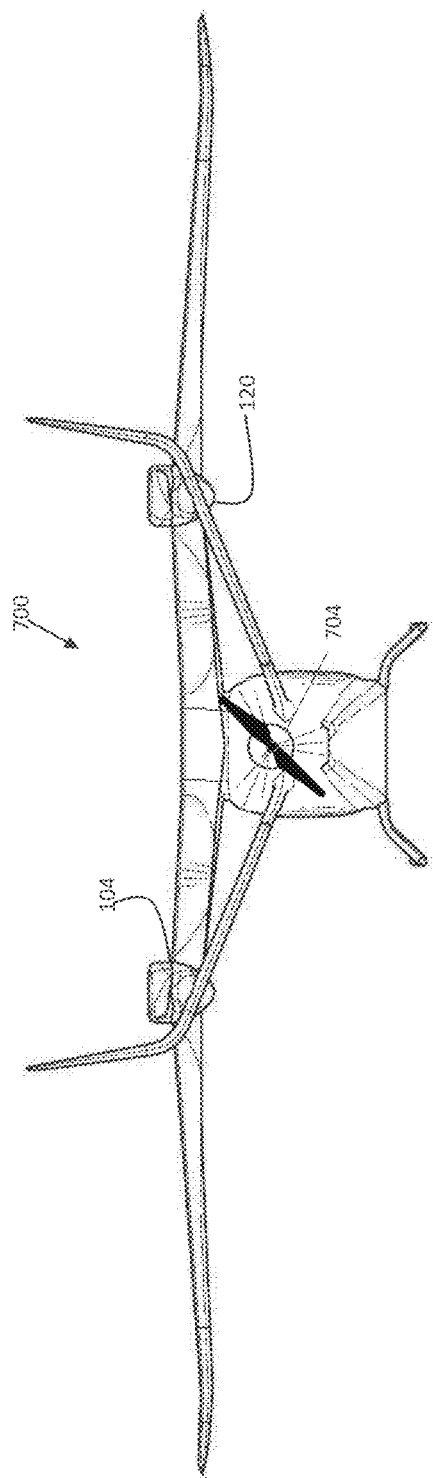
FIG. 7 is a schematic diagram depicting an aircraft incorporating the disclosed system.

Referring now to FIG. 7, an exemplary embodiment of a vehicle 700 with a stowable propulsion system is illustrated. Vehicle 700 may be any vehicle that may be propelled by a propulsor such as at least a propulsor 104 as described above, including without limitation an aircraft and/or watercraft. As a non-limiting example, vehicle 700 may include an electronic aircraft. Vehicle may be an aircraft that takes off or lands vertically, such as without limitation an electronic vertical takeoff and landing (eVTOL) aircraft. In an embodiment, vehicle 700 includes at least a structural feature 108, which may be any at least a structural feature 108 as described above in reference to FIGS. 1A-6. Vehicle 700 includes at least a rotor 112; at least a rotor 112 may be any at least a rotor 112 as described above in reference to FIGS. 1A-6. Vehicle 700 may include at least a motor 116 mechanically coupled to the at least a rotor 112 to cause the rotor to rotate when activated; at least a motor 116 may include any at least a motor 116 as described above in reference to FIGS. 1A-6. Vehicle 700 may include at least a chamber 120 at the at least a propulsor 104. The at least a chamber 120 and the at least a propulsor 104 may be movable relative to one another between a first configuration in which the at least a rotor 112 is stowed within the at least a chamber 120 and a second configuration in which the at least a rotor 112 is deployed outside of the at least a chamber 120; this may be implemented by any means or method as described above in reference to FIGS. 1A-6. Vehicle 700 may include at least a heating element 132 thermally connected to the at least a chamber 120. The heating element 132 heats the chamber and at least a rotor 112 when the at least a chamber 120 and the at least a propulsor 104 are in the first configuration; this may be implemented according to any means or method as described above in reference to FIGS. 1A-6.

With continued reference to FIG. 7, vehicle 700 may include at least a non-stowable propulsor 704. At least a non-stowable propulsor 704 may be any propulsor suitable for use as at least a propulsor 104 as described above. As a non-limiting example at least a non-stowable propulsor may include a propeller or rotor used for wing-based or "cruising" flight when system 100 is not deployed; in other words, vehicle 700 may use system 100 to take off, land, and hover, and may then use at least a non-stowable propulsor 704 for other phases of flight. Non-stowable propulsor 704 may be movable between one or more positions; for instance, non-stowable propulsor may be moveable between a substantially vertical position for landing, takeoff, or hovering and a substantially horizontal position for other phases of flight.

Figure 8A:
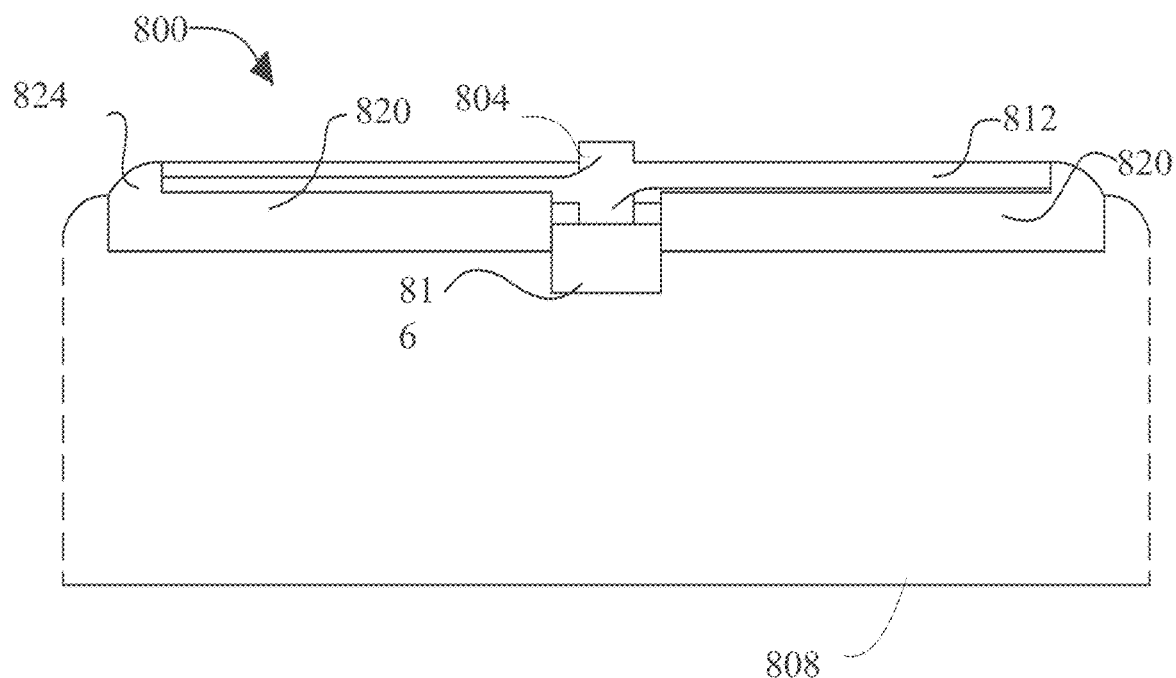
FIGS. 8A-B are schematic diagrams depicting an exemplary embodiment of the disclosed system.
Figure 8B:
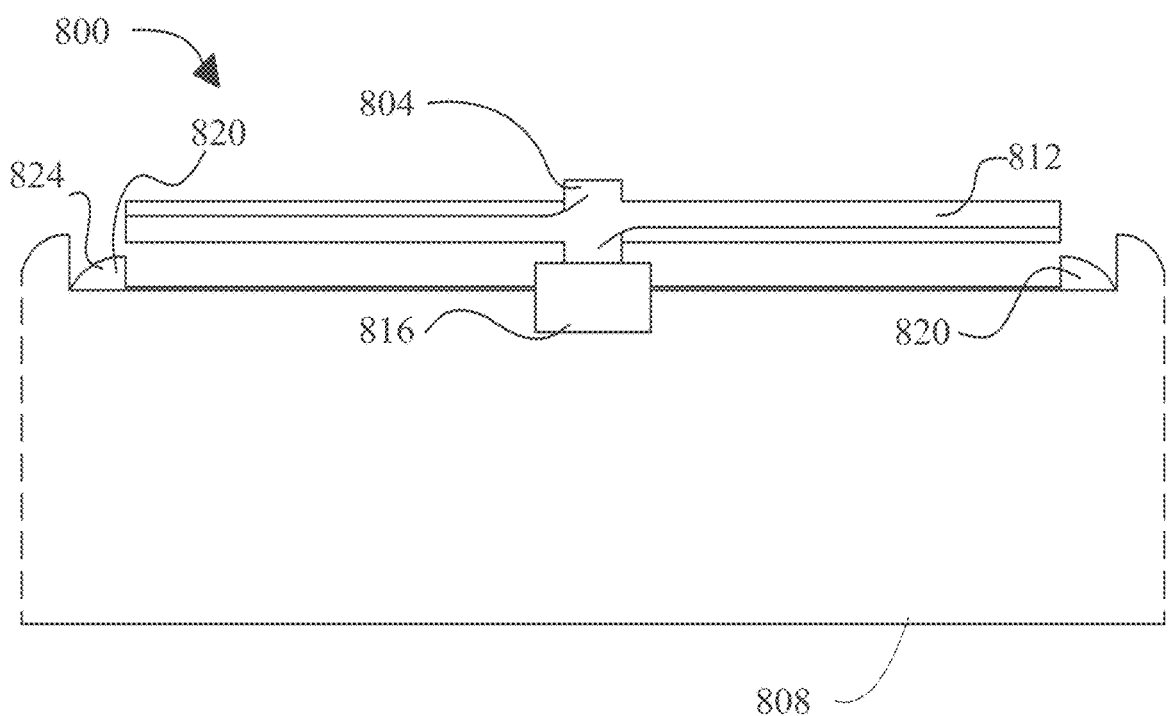

Turning now to FIGS. 8A-B, an exemplary embodiment of a selectively deployable propulsor system 800 is illustrated. System 800 includes at least a propulsor 804; at least a propulsor may be any at least a propulsor suitable for use as at least a propulsor 104 as described above. At least a propulsor 804 may be mounted on at least a structural feature 808, which may include any feature suitable for use as at least a structural feature 808 as described above. At least a propulsor may include at least a rotor 812, which may include any rotor suitable for use as at least a rotor 112 as described above. At least a propulsor may include at least a motor 816 mechanically coupled to the at least a rotor to cause the rotor to rotate when activated; at least a motor 816 may include any motor suitable for use as at least a motor 116 as described above.

Still viewing FIGS. 8A-B, system 800 may include at least a rotor cover 820. At least a rotor cover 820 may be movable between a first position covering at least a portion of the at least a rotor 812, for instance as shown in FIG. 8A, and a second position in which the at least a rotor 812 is exposed, for instance as shown in FIG. 8B. At least a rotor cover 820 may, as a non-limiting example, include one or more cavities that admit at least a portion of at least a rotor 812 when at least a rotor cover 820 is in first position. At least a rotor cover 820 may have an aerodynamically shaped exterior surface, functioning, for instance, to direct air around at least a rotor 812 when in first position. At least a rotor cover 820 may, for instance, cover a gap between at least a rotor 812 and at least a structural feature 808 when in first position. At least a rotor cover 820 may include a tip section 824 that covers a tip of at least a rotor 812 when in first position; at least a tip section may be at a front end of at least a rotor cover 820 where "front" is a position defined as a leading position in a direction of travel of a vehicle incorporating system 800.

With continued reference to FIGS. 8A-B, at least a rotor cover 820 may be movable between first position at second position by any suitable means, including any means as described above in reference to FIGS. 1A-7 for covering or uncovering a rotor. For instance, at least a rotor cover 820 may slide in a longitudinal direction to cover or uncover at least a rotor 812. Alternatively, and as illustrated for exemplary purposes in FIGS. 8A-B, at least a rotor cover 820 may move vertically between first position and second position, by, for instance, retracting into at least a structural feature 808 to move into second position, and extending upward therefrom to move into the first position; this may be accomplished using any linear actuator including without limitation, pneumatic, hydraulic, or motorized systems for propelling a component along a linear direction. Persons skilled in the art, upon reviewing the entirety of this disclosure, will be aware of various means whereby at least a rotor cover 820 may be movable between first position and second position.

Still viewing FIGS. 8A-B, at least a rotor cover 820 may be constructed of any material or combination of materials suitable for use in construction of at least a structural element 108, at least a propulsor 104, at least a rotor 112, or any other element as described above in reference to FIGS. 1A-7. At least a rotor cover 820 may have any suitable form; for instance, at least a rotor cover may present a nacelle surface or the like when in the first position, either in combination with at least a rotor or by covering at least a rotor. Nacelle surface may be a curved surface over which wind or air passes with a low degree of turbulence; persons skilled in the art, upon reviewing the entirety of this disclosure, will be aware of various forms that rotor cover 820 may take to act as a nacelle surface. In an embodiment, at least a rotor cover 820 may include a plurality of odd-shaped winglets protruding in various directions resulting in balancing of air pressure applied to the vehicle, reduction of drag, and smoothening of air that comes into contact with the vehicle allowing the vehicle to cut through the air faster. The plurality of odd-shaped winglets may be configured to support synchronous movement with at least a rotor cover 820 in order to reduce drag incurred during flight.

Figure 9:
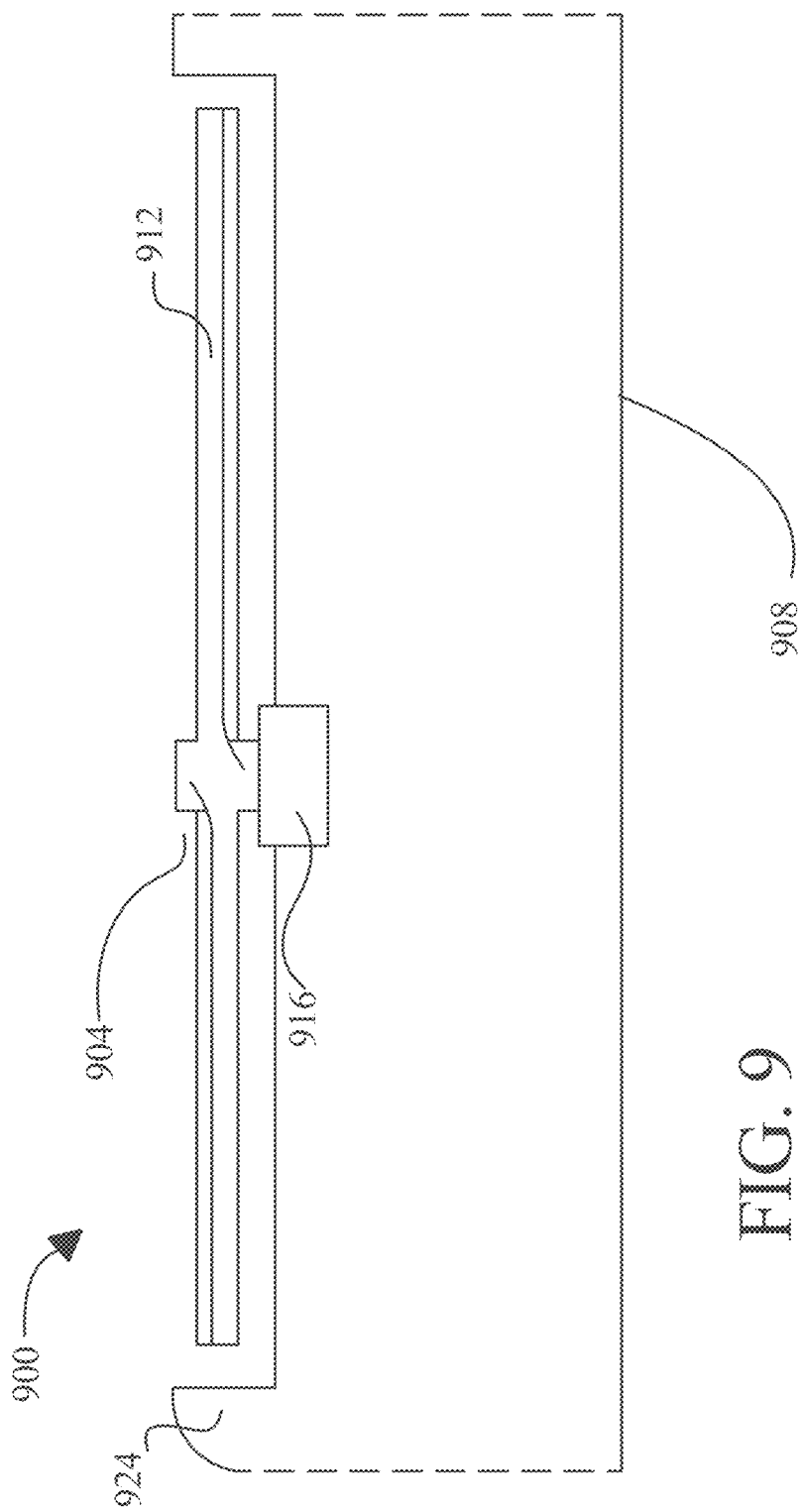
FIG. 9 is a schematic diagram depicting an exemplary embodiment of the disclosed system.

Turning now to FIG. 9, an embodiment of a selectively deployable propulsor system 900 is illustrated. Selectively deployable propulsor system 900 includes at least a propulsor 904; at least a propulsor may be any at least a propulsor suitable for use as at least a propulsor 104 as described above. At least a propulsor 904 may be mounted on at least a structural feature 908, which may include any feature suitable for use as at least a structural feature 908 as described above. At least a propulsor may include at least a rotor 912, which may include any rotor suitable for use as at least a rotor 112 as described above. At least a propulsor may include at least a motor 916 mechanically coupled to the at least a rotor to cause the rotor to rotate when activated; at least a motor 916 may include any motor suitable for use as at least a motor 116 as described above.

Still viewing FIG. 9, system 900 may include an aerodynamic lead surface 924. Aerodynamic lead surface 924 may be a surface that precedes at least a rotor in a direction of travel of a vehicle incorporating system 900. For instance, where at least a rotor is aligned in the direction of travel, so that it presents its end toward the direction of travel, aerodynamic lead surface 924 may substantially obscure at least a rotor from that direction; at least a rotor 912 may be so aligned when not being used for propulsion. aerodynamic lead surface 924 may be constructed of any material or combination of materials suitable for use in construction of at least a structural element 108, at least a propulsor 104, at least a rotor 112, or any other element as described above in reference to FIGS. 1A-7. Aerodynamic lead surface 924 may have any suitable form; for instance, at least a rotor cover may present a nacelle surface or the like when in the first position, either in combination with at least a rotor or by covering at least a rotor. Nacelle surface may be a curved surface over which wind or air passes with a low degree of turbulence; persons skilled in the art, upon reviewing the entirety of this disclosure, will be aware of various forms that aerodynamic lead surface 924 may take to act as a nacelle surface. In some embodiments, aerodynamic lead surface 924 has a form of a "bump" or other curved surface that rises up in front of at least a rotor.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
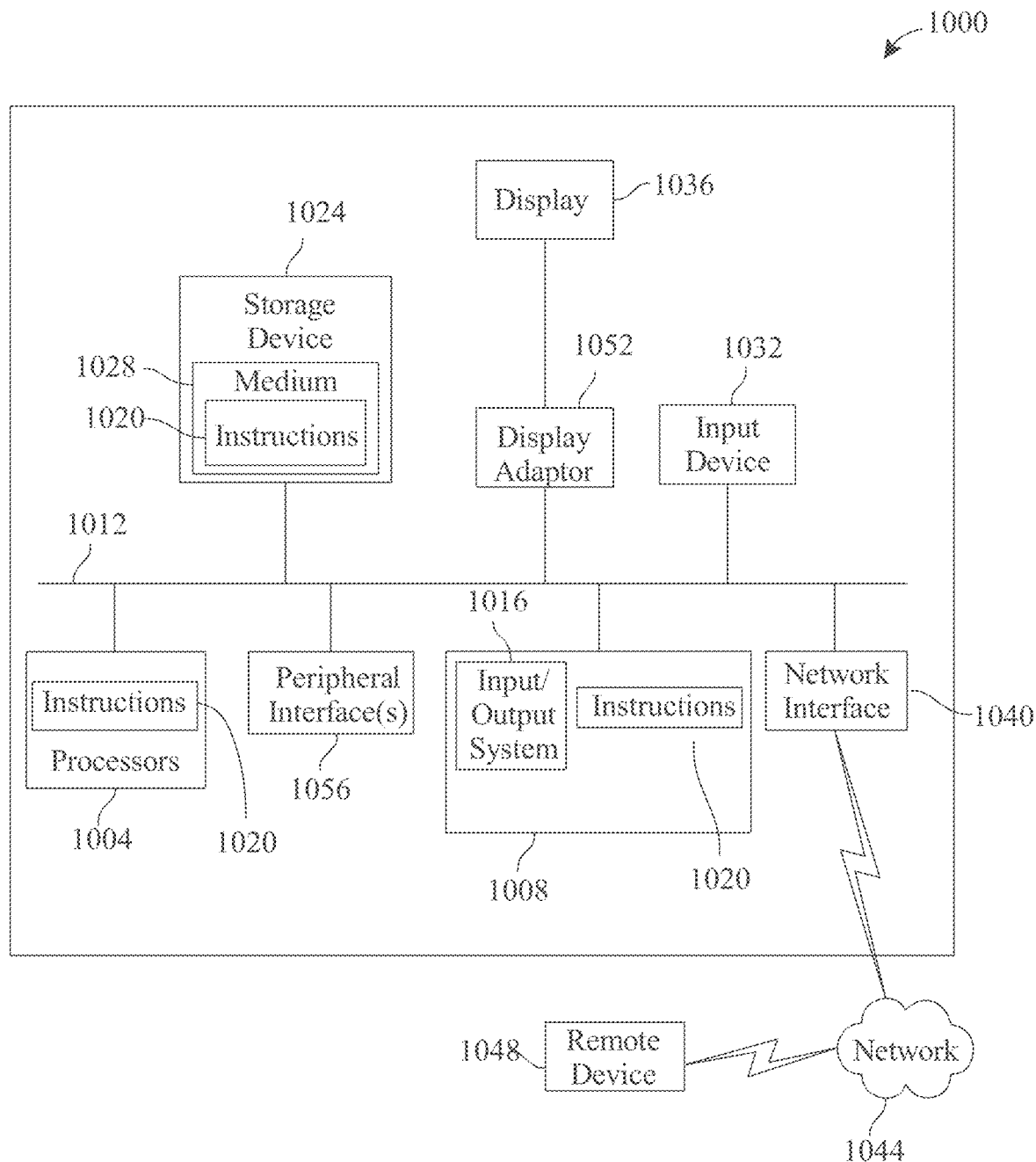
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Memory 1008 may include various components (e.g., machine-readable media) including, but not limited to, a random-access memory component, a read only component, and any combinations thereof. In one example, a basic input/output system 1018 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1038, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1038. Examples of a display device include, but are not limited to, a liquid crystal display (LCD), a cathode ray tube (CRT), a plasma display, a light emitting diode (LED) display, and any combinations thereof. Display adapter 1052 and display device 1038 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, devices, and/or software disclosed herein. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A selectively deployable propulsor system for an electric aircraft, the system comprising:
    at least a propulsor mounted on at least a structural feature of the electric aircraft, wherein the at least a propulsor includes:
        at least a rotor; and
        at least a motor mechanically coupled to the at least a rotor configured to cause the rotor to rotate when activated;
    at least a heated chamber configured to comprise the at least a propulsor, wherein the at least a heated chamber and the at least a propulsor are configured to move relative to one another between a first configuration in which the at least a rotor is stowed within the at least a heated chamber and a second configuration in which the at least a rotor is deployed outside of the at least a heated chamber;
    at least a temperature sensor configured to detect a temperature of the at least a propulsor; and
    at least a vehicle controller coupled to the electric aircraft and the at least a temperature sensor, wherein the at least a vehicle controller is configured to control the movement of the at least a propulsor between the first configuration and the second configuration as a function of the temperature of the at least a propulsor.

2. The system of claim 1, wherein the at least a motor includes at least an electric motor.

3. The system of claim 1, wherein the at least a propulsor further comprises a retraction mechanism that retracts the at least a rotor into the at least a chamber to place the at least a rotor and the at least a chamber in the first configuration, and extends the rotor out of the at least a chamber to place the at least a rotor and the at least a chamber in the second configuration.

4. The system of claim 1, wherein the at least a chamber further comprises at least an enclosing panel, and wherein the at least an enclosing panel is configured to enclose the interior space of the at least a chamber in a closed position and relocate forming an opened position exposing the interior space of the at least a chamber.

5. The system of claim 4, wherein the at least an enclosing panel is configured to retain the at least a rotor in the interior space of the at least a chamber in the first configuration and expose the at least a chamber and at least a rotor in the second configuration.

6. The system of claim 1, wherein the at least a rotor is further configured to comprise at least a rotor cover configured to couple to the at least a rotor, wherein the at least a rotor cover comprises an aerodynamic exterior surface and a plurality of cavities configured to shelter the at least a rotor and interact with the at least a structural feature when the at least a rotor is in the first configuration.

7. The system of claim 1, wherein the electric aircraft is an electric vertical takeoff and landing aircraft.

8. The system of claim 1, wherein the at least a chamber further comprises at least a drainage opening, the at least a drainage opening configured to permit liquid to drain from the at least a chamber.

9. The system of claim 1 further comprising at least a control circuit.

10. The system of claim 9, wherein the control circuit is further configured to detect at least a change in flight condition.

11. A method for selectively deploying a propulsor system for an electric aircraft, the method comprising:
   detecting, at an at least a control circuit, at least a change in flight condition;
   receiving, at an at least a vehicle controller, the at least a change in flight condition;
   detecting, by at least a temperature sensor, a temperature of the at least a propulsor; and
   controlling, by the at least a vehicle controller, the movement of at least a propulsor of the electric aircraft from a first configuration to a second configuration as a function of the at least a change in flight condition and the temperature of the at least a propulsor, wherein the first configuration is within a heated chamber.

12. The method of claim 11, wherein the electric aircraft is an electric vertical takeoff and landing aircraft.

13. The method of claim 11, wherein the at least a change in flight condition includes a determination that the electric aircraft is entering a cruise phase of flight.

14. The method of claim 11, wherein the method further comprises:
   detecting, at the at least a control circuit, at least a second change in flight condition;
   receiving, at the at least a vehicle controller, the at least a second change in flight condition; and
   controlling, by the at least a vehicle controller, the movement of the at least propulsor of the electric aircraft from a second configuration to a first configuration as a function of the at least a second change in flight condition.

15. The method of claim 14, wherein the at least a second change in flight condition includes a determination that the electric aircraft is entering a hover phase of flight.

16. A vehicle with a stowable propulsion system, the vehicle comprising: at least a structural feature;
   at least a propulsor mounted on the at least a structural feature, wherein the at least a propulsor includes:
      at least a rotor; and
      at least a motor mechanically coupled to the at least a rotor to cause the rotor to rotate when activated;
   at least a heated chamber at the at least a propulsor, wherein the at least a heated chamber and the at least a propulsor, are movable relative to one another between a first configuration in which the at least a rotor is stowed within the at least a heated chamber and a second configuration in which the at least a rotor is deployed outside of the at least a chamber;
   at least a temperature sensor configured to detect a temperature of the at least a propulsor; and
   at least a vehicle controller coupled to the electric aircraft and the at least a temperature sensor, wherein the at least a vehicle controller is configured to control the movement of the at least a propulsor between the first configuration and the second configuration as a function of the temperature of the at least a propulsor.

17. The vehicle of claim 16, wherein the vehicle further comprises at least a control circuit, wherein the at least a control circuit is configured to detect at least a change in flight condition.

18. The vehicle of claim 17, wherein the vehicle further comprises an aircraft.

19. The vehicle of claim 18, wherein the aircraft further comprises an electric aircraft.

20. The vehicle of claim 18, wherein the aircraft further comprises a vertical takeoff and landing aircraft.

* * * * *